United States Patent [19]

MacKay

[11] Patent Number: 5,307,456
[45] Date of Patent: * Apr. 26, 1994

[54] INTEGRATED MULTI-MEDIA PRODUCTION AND AUTHORING SYSTEM

[75] Inventor: Michael T. MacKay, Vallejo, Calif.

[73] Assignee: Sony Electronics, Inc., Park Ridge, N.J.

[*] Notice: The portion of the term of this patent subsequent to Sep. 15, 2009 has been disclaimed.

[21] Appl. No.: 827,009

[22] Filed: Jan. 28, 1992

Related U.S. Application Data

[63] Continuation-in-part of Ser. No. 661,694, Feb. 27, 1991, abandoned, which is a continuation-in-part of Ser. No. 622,821, Dec. 4, 1990.

[51] Int. Cl.⁵ .............................................. G06F 15/62
[52] U.S. Cl. ..................................... 395/154; 395/155
[58] Field of Search ............... 395/152, 153, 154, 155, 395/156, 157, 159, 161, 200

[56] References Cited

U.S. PATENT DOCUMENTS

| | | | |
|---|---|---|---|
| 4,805,134 | 2/1989 | Calo et al. | 395/161 |
| 4,875,186 | 10/1989 | Blume, Jr. | 364/900 |
| 4,937,825 | 6/1990 | Ballard et al. | 371/20.1 |
| 5,007,017 | 4/1991 | Kobayashi | 395/200 |
| 5,041,966 | 8/1991 | Nakai et al. | 364/200 |
| 5,043,884 | 8/1991 | Kuhlmann et al. | 395/200 |
| 5,043,938 | 8/1991 | Ebersole | 395/200 |
| 5,088,032 | 2/1992 | Bosack | 395/200 |
| 5,134,560 | 7/1992 | Ferriter et al. | 395/159 |
| 5,148,154 | 9/1992 | MacKay et al. | 340/712 |

OTHER PUBLICATIONS

Rangan et al., "A Window-Based Editor for Digital Video and Audio", Proceedings of the Twenty-fifth Hawaii International Conference on System Sciences, IEEE Computer Society Press, (1991) vol. 2 pp. 640-648.

Sony Video Switcher Operation Manual, Sony Corporation ©1989.

Quantel Harry and Encore promotional brochure, Quantel Inc. 1988.

DF/X200 and Composium promotional brochure, Digital F/X Inc.

(List continued on next page.)

Primary Examiner—Heather R. Herndon
Assistant Examiner—N. Kenneth Burraston
Attorney, Agent, or Firm—Jeffrey J. Blatt

[57] ABSTRACT

A network multi-media production and authoring system. A real-time network referred to as an "AV LAN" is defined. Coupled to the AV LAN are a number of shared multi-media production resource devices. These multi-media production resource devices include video tape recorders, audio tape recorders, video titling devices, graphics devices, special effects generators, etc. Also connected to the AV LAN are a number of workstations which are used to control the production resources connected to the AV LAN. The production resources are connected to the AV LAN through an interface unit known as a 'device translator'. The device translator is a microprocessor driven device that translates coded messages received over the AV LAN into specific commands which the particular production resource understands. The edit workstations present the user with an intuitive graphical user interface that enables the user access the various production resources in order to create, define, edit, and store elements for use in a multi-media production. The scalable nature of the AV LAN system allows users to design and build AV LAN networks to suit their particular needs. An AV LAN system can be as simple as a single workstation connected to a single production resource device. The AV LAN can be expanded into entire production, editing, and post-production studio. This is accomplished by coupling together several individual AV LAN networks using a network bridge. Efficient organization of such a large system can be accomplished by grouping together like kind production resources onto the same local AV LAN network.

34 Claims, 20 Drawing Sheets

OTHER PUBLICATIONS

The Integrated Design Studio promotional brochure, Spaceward Ltd., London England.
Artisan promotional brochure, Media Logic Inc., Santa Monica, Calif.
Soundstation II promotional brochure, Digital Audio Research (DAR) San Francisco, Calif.
ScreenSound promotional; brochure ©1989 Solid State Logic Ltd., Begbroke, Oxford, England.
Sound Droid promotional brochure, The Droid Works, North Hollywood, Calif.
CompuSonics Video PC/Moviemaker promotional brochure, ©1986 CompuSonics Video Corp. Palo Alto, Calif.
E-Pix Hybrid Editing System promotional brochure, Amtel Systems, Inc., Nashua, New Hampshire.
Emc$^2$ promotional brochure, Editing Machines Corp. Washington, D.C.
Avid/1 Media Composer Product Description, Avid Technology Inc., Burlington, Mass.
Midas I And Midas II Desktop Production System promotional brochure, Seehorn Technologies, Inc., San Jose, Calif.
Desktop Video Workshop promotional brochure, Pinnacle Systems, Inc. Santa Clara, Calif.
Montage Picture Processor System II promotional brochure, Montage Group Ltd., New York, N.Y.
EditDroid promotional brochure, The Droid Works, North Hollywood, Calif.
Abekas A34 Solo promotional brochure, Abekas Inc.
AVC/ADO promotional brochure ©1987, Ampex Corp., Redwood City, Calif.
Echelon Company and Product Literature, Echelon Corp, Palo Alto, Calif.
Sony DVS-8000 Digital Video Switcher Product Information, Sony Corp, San Jose, Calif.
Sony DME-5000 Digital MultiEffects Product information, Sony Corp, San Jose, Calif.
Sony Library management System Product Information, Sony Corp, San Jose, Calif.
Sony DVR-2100 Component Digital VTR Product Information, Sony Corp, San Jose, Calif.
Sony DVR $\propto$ 28 Composit Digital VTR Product Information, Sony Corp, San Jose, Calif.
Sony DIR-1000 Digital Instrument Recorder Product Information, Sony Corp, San Jose, Calif.
Sony VSP -8000 Video Sound Processor Product Information, Sony Corp., San Jose, Calif.
Sony Dash Multi-Channel Recorders Product Information, Sony Corp, San Jose, Calif.
Sony 2 Channel Dash Recorders Product Information, Sony Corp, San Jose, Calif.

INTEGRATED MULTI-MEDIA PRODUCTION AND AUTHORING SYSTEM

This application is a continuation in part of parent application, Ser. No. 07/661,694, filed Feb. 27, 1991, now abandoned which is a continuation in part of application, Ser. No. 07/622,821, filed Dec. 4, 1990 pending.

BACKGROUND OF THE INVENTION

1. Field of the Invention

The present invention relates to methods and apparatus to provide an integrated intelligent environment for the production and post-production of multi-media works. In particular, the present invention relates to the integration of a plurality multi-media production and post-production resources into a networked multi-media production and authoring system. The system provides multiple users with control of a plurality of dynamically allocated shared resources using a common intuitive user interface.

2. Art Background

A variety of resources must be integrated, scheduled and coordinated in the production of a feature film or video presentation. Various production media resources such as video, dialog audio, special effects, music audio, and graphics must be edited and selectively integrated into the overall production. Consequently, computer controlled editing systems and integration methods have been used for editing and synchronization of completed music scores, special effects sequences and the like.

Although present editing systems are capable of machine control, they provide few capabilities in dealing with the content of the actual program being edited. Frequently, identifiable sequences of a production, such as special effects, are accomplished through the use of special effects personnel who operate independently of the primary director and production scheduler. Discrete teams of individuals may work on audio editing, video editing, titles, special effects and other related operations required to collectively form a multi-media production. For example, suppose an advertisement agency decides to produce a beer commercial in which the star is a dog. In the final day of post-production, an executive makes a decision which requires that the dog be removed from the commercial and that girls in bikinis should be inserted as the stars of the commercial. If the dog was shot using well-known blue screen image technology and inserted in the final production as a matte layer, it would be easy to remove the image of the dog and replace him with the girls in the bikinis. However, even assuming that the dog had been shot using a blue screen technique, the task remains to remove all dog sounds and other elements related to the previous star. This task is not simple, nor inexpensive, using today's technology.

As will be appreciated from the discussion which follows, the elimination of the dog and the replacement with the girls may be accomplished during a single edit session at one workstation utilizing the present invention's integrated multi-media production and authoring system. Utilizing the present invention, cross media links are established between the various production resources comprising a multi-media production. Using a common user interface (see copending patent application, Ser. No. 07/622,821, filed Dec. 4, 1990) the visual image of the dog may be removed and the bikinied girls added. Since the audio track with the dog sounds is linked to the dog visual image, it is easily removed such that an update of all audio and related information is completed, necessary to modify the commercial in a post-production process.

The present invention provides an integrated intelligent studio in which a multi-media production may be realized in a coordinated fashion. Multi-media projects cover many communication media types, including printed materials, audio programs, television shows, feature films and many others. The ability to integrate the functions of the resources utilized in the production of multi-media projects into a single shared system provides a level of performance and capability unknown in the prior art. A variety of hardware and software tools addressing each phase of the multi-media production provide machine readable information from the initial project conception to completion. The present invention's approach of integration permits individual or grouped elements in the multi-media production to be incrementally added or deleted from the production.

As will be described, the present invention provides the users with total control of all allocated production resources through a high-performance multi-media workstation. Multiple workstations may be configured into a distributed network architecture, each specifically configured for a range of tasks, as described more fully below.

SUMMARY OF THE INVENTION

An integrated multi-media production and authoring system is disclosed. The present invention includes a plurality of multi-media production resources coupled to real-time local area networks referred to as "AV LANs". The production resources are generally placed into individual AV LAN networks by job function (e.g., audio production resources, video post production resources, etc.). Each production resource, such as a video tape recorder or a video production switcher, is coupled to the AV LAN through a device translator which translates generic device commands received over the AV LAN into device-specific commands for the particular production resource. Each of the individual AV LANs are in turn coupled to one another over network bridges. In addition to the various production resources, individual "edit workstations", and other computers including mini-computers, mainframes and personal computers, etc., are coupled to the AV LANs. The edit workstations are used to control the production resources located on the AV LANs. Each of the workstations utilize the present invention's intuitive graphical user interface. The graphical user interface of the present invention includes a control frame which, in practice, substantially fills the outer border of the display screen coupled to a workstation. The control frame is comprised of control panels which surround an application area, and acts as a consistent user interface. The application area is used by the various applications to display data. One use of the application area is to display view ports of the present inventions "venues" concept. The "venues" concept is a method of storing information about resources coupled to the AV LAN using three-dimensional element representations. "View ports" are used to provide a two-dimensional windows to view the three-dimensional data elements in three-dimensional venues. A top view port illustrates the time relationship between the various resources in a "venue". In operation, a user specifies mandatory attributes, which an element must have, and optional attributes that define the element representing the resource within the application area. Once an element is defined, it may be selectively "dragged" down to an event horizon bar at which time, time data is displayed in the time view port of the control frame. Using the intuitive user interface of the present invention, multi-media elements may be created, edited, bundled, integrated and rearranged along the event horizon. A user may address and selectively use the production resources coupled to the various AV LANs, and then edit, modify and update the created work product using the user interface. Accordingly, an integrated intelligent studio is disclosed which permits a plurality of users to access a plurality of shared production resources heretofore unknown in the prior art.

NOTATION AND NOMENCLATURE

Figure 1:
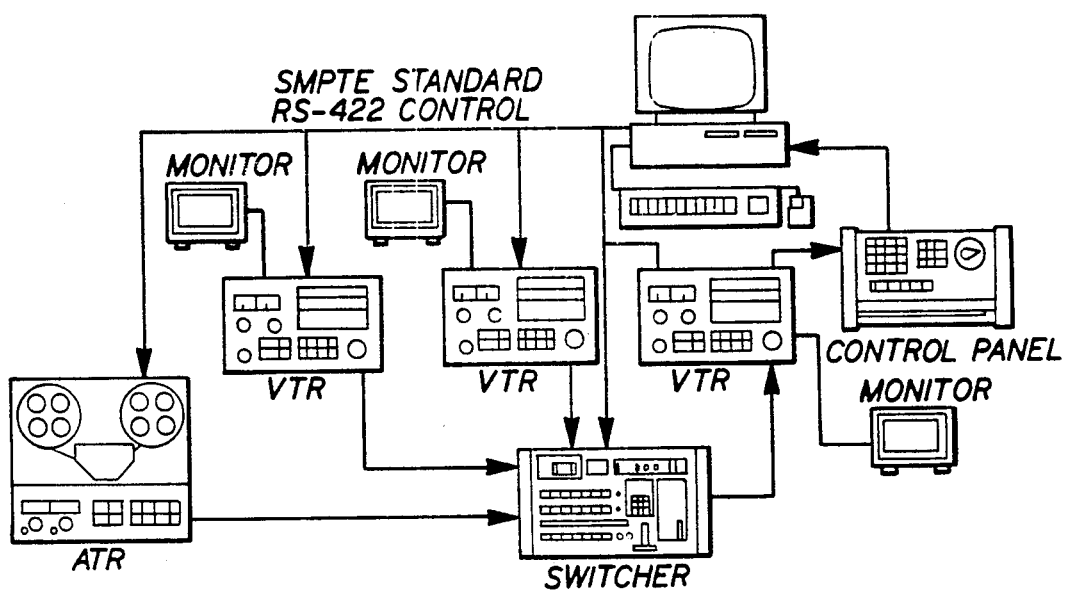
FIG. 1 is an example of a computer controlled video editing device that is in the prior art.

In the following description, numerous specific details are set forth such as functional blocks representing data processing devices or networks, window configurations, etc. in order to provide a thorough understanding of the present invention. However, it will be apparent to one skilled in the art that the present invention may be practiced without these specific details. In other instances, well known circuits and structures are not described in detail in order not to obscure the present invention unnecessarily.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, bytes, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing the operations of the present invention include general purpose digital computers or other similar devices. In all cases the distinction between the method operations in operating a computer and the method of computation itself should be borne in mind. The present invention relates to both apparatus and method steps for operating a computer in processing electrical or other (e.g. mechanical, chemical) physical signals to generate other desired physical signals.

GLOSSARY OF TERMS

The following list of technical definitions for certain terms associated with the present invention is provided for this Specification:

ANALOG ADJUSTMENTS— Real Time adjustments that are made to production resources over the AV LAN. These type of adjustments would normally be made using a local control panel or console on a production resource. An example might be an audio fader, a switcher transition bar, or a key clip adjustment on a video switcher. These adjustments are made using a Control Console or other assignable input device connected to an edit workstation and transmitting the adjustment over the AV LAN.

ANALOG ADJUSTMENT HISTORY— The data for a series of analog adjustments that are made to a production resource which are Time Stamped and recorded by the Edit Workstation. The Time Stamped information allows the system to accurately re-create the series of Analog Adjustments using their relative times.

ASSIGNABLE INPUT DEVICE— An input device coupled to an edit workstation that may be assigned to perform many different input functions as designated by the software.

ASYNCHRONOUS COMMUNICATION— Communications that do not have a specific relationship in time to the system reference. The communications themselves may be Time Line or Time Stamped information, but do not occur at an absolute position within a frame, or within a guaranteed frame boundary.

AUDIO TAPE RECORDER (ATR)— A type of production resource that records audio signals on to magnetic tape.

AUTOMATIC EVENTS— An event that requires the synchronization of one or more devices using a Time Line, or the automatic positioning of material on a production resource. The event may involve a preview or a record of information, or may simply be a cue to a particular time code location.

AV LAN— A defined communications network that will couple all of the various devices present in a production and post production environment together with edit workstations. This will include devices such as VTRs, DME units, production switchers, routing switchers, random access recorders, time base correctors, graphics and animation devices, etc.

CONTROL CONSOLE— An assignable input device which can be assigned to any controllable device on the AV LAN. The control console has N number of assignable controls (these controls will be similar to an endless audio fader, see the copending application 'Variable Scale Input Device', Ser. No. 07/622,727, filed Dec. 12, 1990), and a conventional transition bar that will be similar to one found on an effects switcher. See copending design patent application entitled "Control Console", Ser. No. 07/718,819, filed Jun. 21, 1991, and assigned to the assignee of the present application for the design of a control console.

D1 VTR— A D1 VTR is a video tape recorder that records video data in a 4:2:2 digital component video format.

D2 VTR— A D2 VTR is a video tape recorder that records video data in a 4 $f_{sc}$ digital composite video format.

DD1 DATA RECORDER— A magnetic tape recorder that stores normal digital data. An example of a data recorder would be the DIR-1000 Series manufactured by Sony Corporation.

DEVICE— A VTR, production switcher, routing switcher, time base corrector, DME unit, graphics or animation device, etc. In general a device is anything that is being controlled via the AV LAN network. The terms 'DEVICE' and 'PRODUCTION RESOURCE' are interchangeable.

DEVICE TRANSLATOR— A generic add-on box that acts as an initial interface between the AV LAN and current devices. The device translator unit has an AV LAN network interface, a central processing unit, memory, and enough generic I/O to allow it to interface to the various interface ports of the current production resources. The standard SMPTE RS-422 interface is supported.

DIGITAL MULTI-EFFECTS UNIT (DME)— A digital video processing device used to create video special effects such as 3D rotations, compression, mirror, page turns, etc.

EDIT WORKSTATION— A computer platform that is coupled to the AV LAN, and controls the production resources on the AV LAN to create and edit multi-media material. Also referred to as 'Workstation'. The presently preferred embodiment is a UNIX based workstation such as a NEWS TM workstation manufactured by SONY CORPORATION or a SPARCstation TM manufactured by Sun Microsystems, Inc.

ISOSYNCHRONOUS COMMUNICATIONS— Communications that are guaranteed a repetitive time slot. Isosynchronous communications are used to transmit data for audio, video, or Real Time control. These applications require a minimum repetitive access to the AV LAN network, and a guaranteed minimum bandwidth between two channels.

LIBRARY MANAGEMENT SYSTEM (LMS)— A Library Management System is a large storage and replay facility of magnetic tapes. The tapes can be formatted to store video data or normal digital data.

MANUAL COMMANDS— In general, manual commands are commands that could be performed at the local console of a production resource by pushing a button. Manual commands may put the production resource into various modes such as Play, Still, Stop, Fast-Forward, Rewind, etc. Manual commands may also change crosspoints on a switcher, or roll a character generator page, etc.

MEDIA ELEMENTS— The various 'pieces' of a multi-media production. They included audio elements, visual elements, graphical elements, etc.

MULTI-MEDIA WORK— A multi-media work is a work that is comprised of a number of different media elements such as video, audio, still photos, music, visual effects, etc.

PLAY LIST— A list of edit decisions that relate directly to the position of the material on a Random Access Device. This list will need to be updated and maintained over the AV LAN as edit decisions are made.

PRODUCTION RESOURCE— A VTR, production switcher, routing switcher, time base corrector, DME unit, graphics or animation device, etc. In general a device is anything that is being controlled via the AV LAN network. The terms 'PRODUCTION RESOURCE' and 'DEVICE' are interchangeable.

PRODUCTION SWITCHER— A production switcher is a device for cutting between two input video signal sources or combining them in a variety of ways such as mixing, wiping, and keying to produce an output video signal.

RANDOM ACCESS DEVICE— A device that can randomly access material in Real Time. This type of device allows an entirely different mode of system operation should the editor so desire. It has a unique requirement for a "Play List", or a list of information to be played to represent a final product. This Play List is downloaded to the Device Translator by an Edit Workstation, and will then be updated over the AV LAN as edit decisions are made.

REAL TIME CONTROL— The ability to control production resources thru the control console, ASCII keyboard, or other assignable input devices connected to the Edit Workstation with no humanly perceptible time delay. The individual production resources allow external control without their own unreasonable perceptible time lag.

REAL TIME COMMUNICATIONS— Communications that are used to make Analog Adjustments and/or control other time critical machine functions over the AV LAN. The Real Time Communications require a guaranteed access to the AV LAN and may need to be Time Stamped to allow the Device Translator to recreate proper command spacing to the Device.

ROUTING SWITCHER— A routing switcher is a hardware device that establishes electrical signal paths between a number of signal sources and a number of signal destinations. Routing Switchers are also referred to as "Matrix switchers".

SLIDER CONTROL— A relative position type device that will control the audio levels and other setup adjustments of the devices connected to the AV LAN. The device is a continuous turn belt that will have LED indicators associated with it to indicate the current position of the assigned control. One possible slider control is fully described in the copending application 'Variable Scale Input Device', Ser. No. 07/622,727, filed Dec. 12, 1990.

TRANSITION BAR— The fader bar located on the control console. This device is an absolute position type device used to remotely control the audio and video transitions of the devices connected to the AV LAN. A similar device would be the a fader arm of a production switcher.

TIME LINE COMMUNICATIONS— A group of commands that are downloaded to a Device Translator prior to an event. Each command has associated with it a specific time that the command function is to be performed. As the system clock reaches the times specified, the Device Translator executed the commands. All Time Line Communication will normally precede an Automatic Event.

TIME STAMPED COMMUNICATIONS— A group of commands that are uploaded from a Device Translator after an event. Each command has associated with it a specific time that the command function took place. The Edit Workstation can then use these relative times to re-create the event at another time in the future. Time Stamped Communications will generally follow an automatic event.

UPLOAD/DOWNLOAD COMMUNICATIONS— Program or data information that is transferred between a Device Translator and an Edit Workstation. This information does not have any specific time information associated with it. It could be the computer software for the Device Translator, or a Play List for a Random Access Device.

VARIABLE MOTION HISTORY— A series of Time Stamped speed adjustments that are recorded by the Device Translator. As dynamic speed adjustments are made over the AV LAN, the Device Translator will Time Stamp the actual machine positions (in frames and fractions of frames), and store this information in memory. This information can later be used to accurately re-create the dynamic speed adjustments, or be uploaded to an Edit Workstation to be placed in the DMS file.

VIDEO TAPE RECORDER (VTR)— A device used to record video signals onto magnetic tape. Advanced Video Tape Recorders can be controlled through a SMPTE standard RS-422 serial port. Such devices are coupled to the AV LAN by using a Device Translator which has both an AV LAN network interface and an RS-422 serial port.

VIRTUAL INTERFACE— A display on an edit workstation screen or virtual reality display, that is designed to emulate the interface display of a real physical resource such as a VTR, production switcher, or DME.

DETAILED DESCRIPTION OF THE INVENTION

The following detailed description describes the present invention and its various components. The description which follows relies upon, and hereby incorporates fully by reference, the parent copending applications Ser. No. 07/661,694, filed Feb. 27, 1991, and Ser. No. 07/622,821, filed Dec. 4, 1990. The reader is directed to the Applicant's copending applications for more detailed descriptions with respect to the user interface of the present invention, as well as the method and selection of various functions and menu items within the user interface.

Overview

In order to simplify the video post-production process, computer controlled video editing systems, such as the prior art system shown in FIG. 1, have been created. Such systems are well known in the art. These systems employ a control computer to directly control a few limited editing resources such as VTRs and ATRs. Although these systems are useful, they are limited in a number of ways. The ability to expand such prior art systems is limited by the number of editing resources that the single controlling computer can effectively control. These systems lack the ability to dynamically share the post-production editing resources among a number of users operating independently. Finally, such systems have very limited edit information storage systems, such as the industry standard EDL (Edit Decision List), which cannot accurately reproduce all the adjustments and modifications made at a previous edit session.

The present invention is designed to remedy such limitations of the prior art systems and provide a very flexible and expandable integrated production and authoring environment. With the present invention, a user can start with as little as a single workstation and a single resource device. As the user's needs expand, additional workstations and resource devices are added to the AV LAN network. Multiple AV LAN networks can be linked together with network bridges. Each workstation added to the AV LAN network is capable of accessing and controlling any of the shared production resources located on the AV LAN network. Workstations can be located at remote sites and have access to any the production resources on the system network. Software is provided to assist a production from the initial planning and budgeting stage until the final release.

Control of all production resources is given to the user through an intuitive graphical user interface available to each workstation. In this manner the director, producer, or other user need not concentrate on the technical details and instead is able to directly focus on the creative aspects. However, as the user works with the system, the system maintains detailed records of the users actions. These records store information such as a history of the decisions made by the user, the user's workstation preferences, and of course the work product created by the user. Thus the system allows users to focus their efforts on the task at hand, while in the background storing information that will allow an accurate reproduction of the edit session.

Since the present invention links together many production resources that can be shared by manner users simultaneously, it allows sophisticated multi-media productions involving numerous producers to be created in "real-time". The real-time nature of the invented integrated production system makes it ideal for use in the media production of "live" events such as news events, concerts, and sporting events. A team of artists, musicians, reporters, editors, and producers could work simultaneously at different workstations producing graphics, titling, music, commentary, and other media elements. The main producer could then immediately access these individual elements over the AV LAN to integrate them and thereby quickly produce a sophisticated multi-media output.

Example Use of the System

Figure 2:
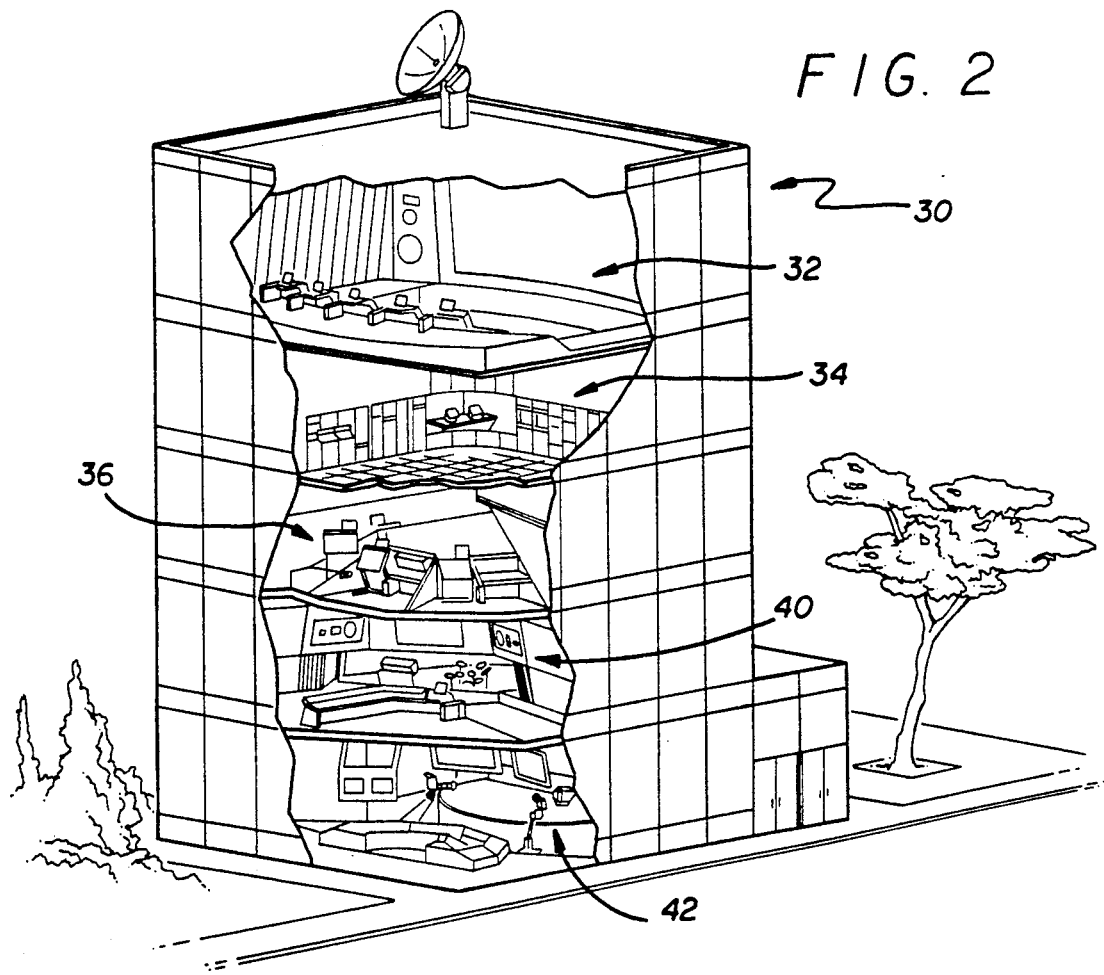
FIG. 2 is an artist's conception of a self contained facility for creating an integrated multi-media production utilizing the teachings of the present invention.

Referring now to FIG. 2, therein is illustrated an artist's conception of a large facility incorporating the teachings of the present invention. The present invention provides an intelligent studio environment to permit access by large numbers of "producers" (also referred to as "users"). A "producer" may be an audio, special effects, video or other multi-media professional whose function is to provide a specific portion of a multi-media production. As will be discussed, these producers are capable of conceiving, promoting and directing most project decisions from individualized multi-media workstations coupled to a variety of networks using a common user interface. The present invention provides an integrated multi-media production and authoring system which may be utilized by a plurality of producers in the creation, editing and post-production of a multi-media work product. This multi-media work product may comprise a motion picture, full-length video, or other similar production. For purposes of this Specification, the term "production" or "work-product" is intended to generically describe all such multi-media productions regardless of distribution media.

As illustrated in FIG. 2, the facility 30 includes multiple levels, such as level 32 for editing, post production and coordination functions, level 34 for total facility control, level 36 for graphics creation and integration, level 40 for audio production and mixing, and level 42 for production and filming live action subjects. It will be appreciated that although FIG. 2 illustrates a self-contained facility for the production and authoring of a multi-media work, the present invention may be practiced using facilities that are geographically remote from one another and coupled over one or more networks for the transmission of digital data, images and the like. Accordingly, the teachings of the present invention are applicable to distributed computing environments, wherein each location communicating with other locations utilize the present invention's common user interface as disclosed in the parent copending application, Ser. No. 07/622,821, filed Dec. 4, 1990 (hereinafter, the "'821 parent").

Figure 3:
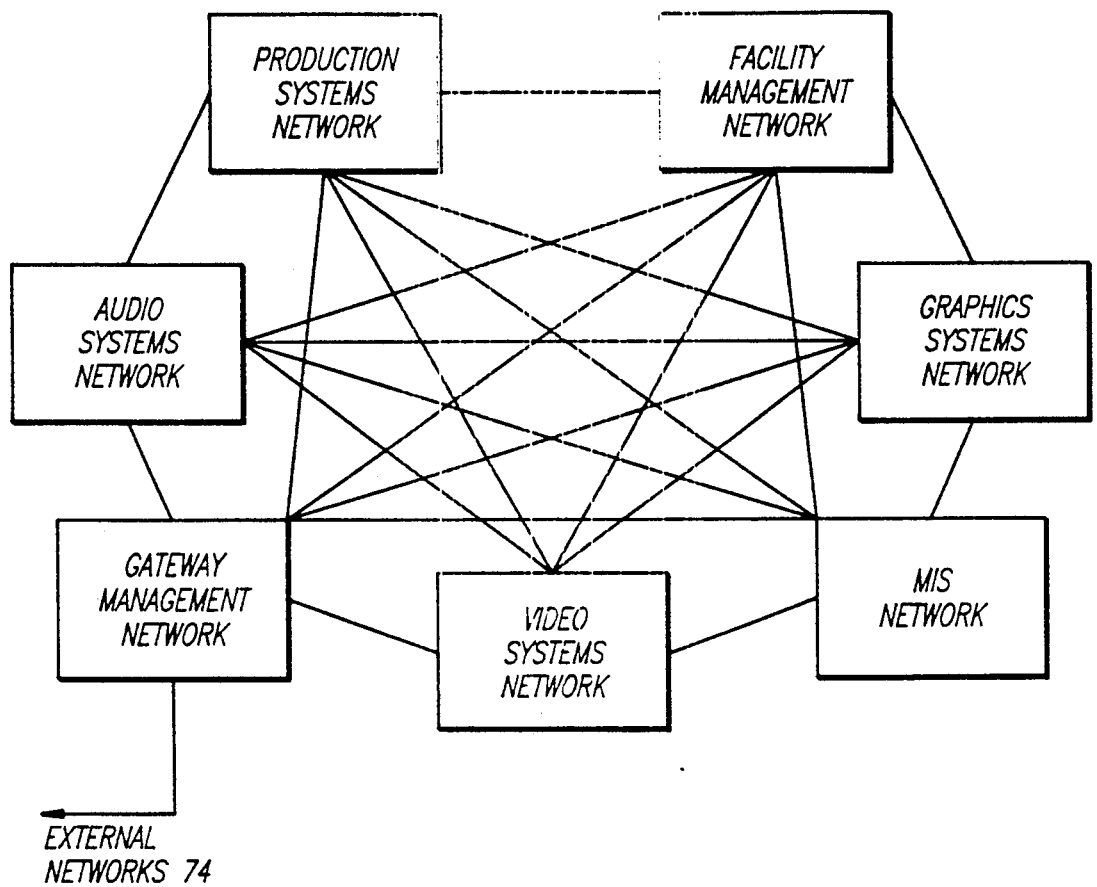
FIG. 3 is a block diagram illustrating the network topology of the present invention's intelligent studio network.

Referring now to FIG. 3, there are numerous components comprising the "intelligent" studio of the present invention. Each of these subsystems is a fully functioning AV LAN network within itself, and similarly, as will be described, workstations coupled to the networks are functioning resources as well. Not all of the described subsystems need be present in every system, each system is built to meet the particular needs of each individual customer. The intelligent studio system can expand as the user's needs change. The term "intelligent studio", as used in this Specification, refers to an AV LAN network with as few as one workstation and two other production resources integrated together up to a full studio complex such as the one illustrated in FIGS. 2 and 3 as well as a style of operation. As illustrated in FIG. 3, the present invention may include various interconnected networks including a production systems network 50, an audio systems network 52, a video systems network 54, a graphics systems network 56, a facilities management network 58, a management information service systems network 60, and a gateway management network 62. The networks are each interconnected to minimize the number of "hops" across network bridges a internetwork message must make. With such a wide variety of production tools being connected to the system, vast amounts of information can be collected and stored during the production of multi-media work. This information can be recalled later and used for such purposes as sequel productions (allowing old sets, props, models, and special effects to be reproduced), associated video games, related toy design, and foreign language translations. As will be described, a common network protocol is used within each network, as well as to couple the various interconnected networks together. Other AV LAN networks can be added as necessary. This Specification will briefly describe the contents of each of the AV LAN networks disclosed in FIG. 3. One possible embodiment of a "video systems network" will be described in detail in order to explain how the network operates.

As shown in FIG. 3, the intelligent studio network includes a gateway management network 62 is coupled to external networks 74, such as Ethernet TM, Internet TM, and other networks to communicate with other computer systems and users at remote locations.

Figure 4:
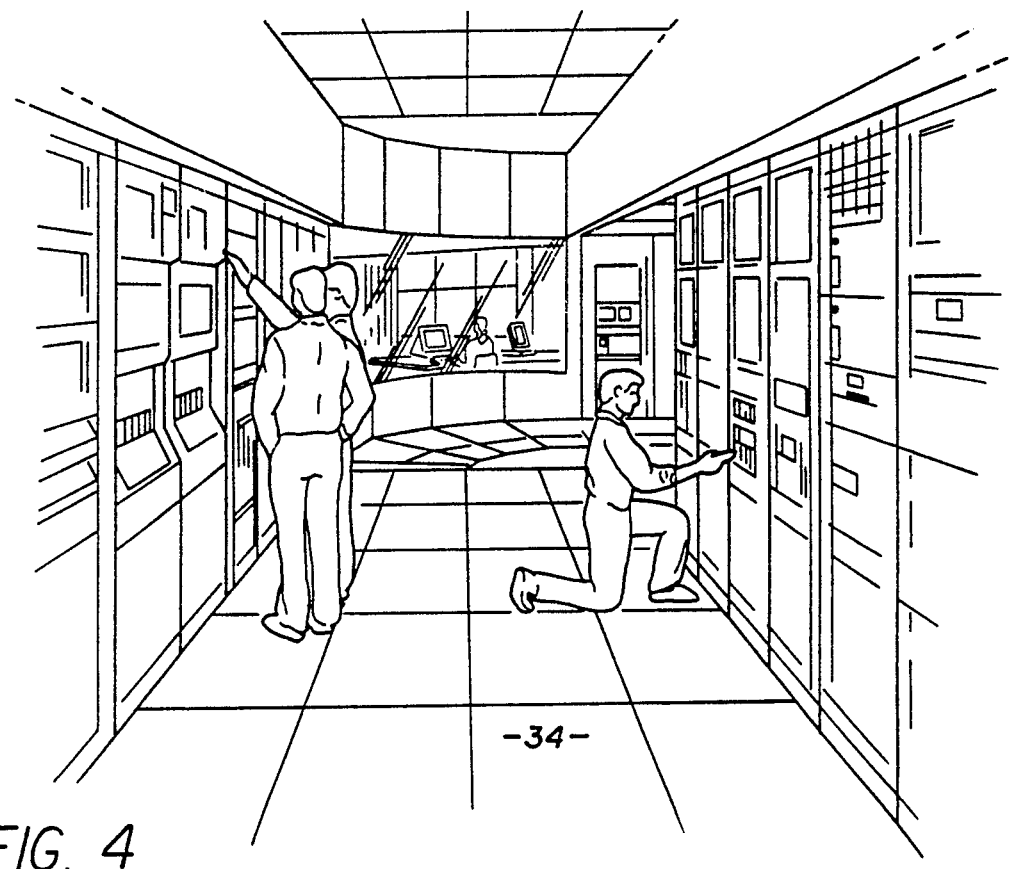
FIG. 4 is an artist's illustration of a control room for the editing and production facilities utilized by the present invention.

Referring now to FIG. 4, an artist's conception of an overall facility control room 34 is disclosed which incorporates and utilizes the teachings of the present invention. From the facility control room 34 illustrated in FIG. 4, the various production resources can be directly controlled as necessary.

Figure 5:
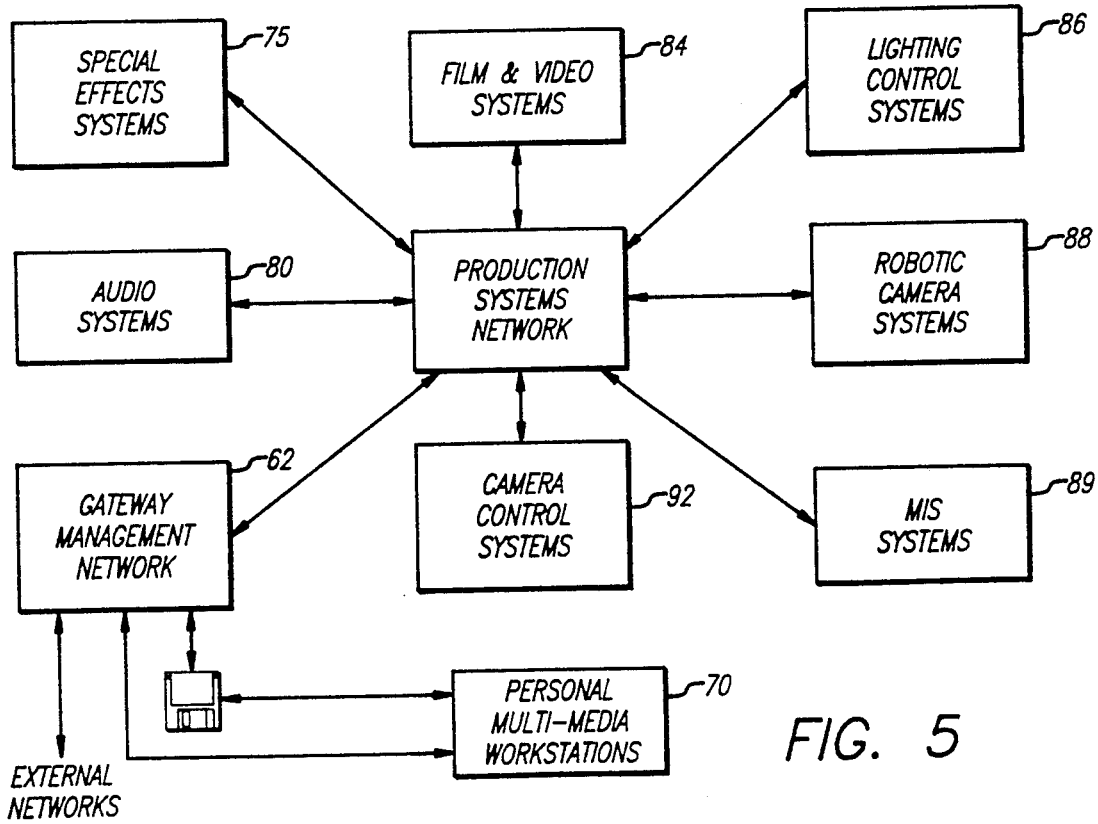
FIG. 5 is a more detailed block diagram of the present invention's production systems network.

FIG. 5 discloses a possible set of resources located on the production system network. The production systems network 50 includes resources such as special effects systems 75, audio systems 80, film and video systems 84, lighting control systems 86, robotic camera systems 88, and management information systems 89, which are coupled to the management information systems (MIS) network (not shown), as well as the camera control systems 92. In addition, as shown, the gateway management network 62 is also coupled to the production systems network, as well as personal media network workstations 70. As described in the Applicant's copending '821 parent application, these resources may be defined and manipulated using the present invention's common user interface.

The production systems network illustrated in FIG. 5 incorporates all automatable production tools. Such tools may range from various writing and word processing tools in the MIS systems 89, to three-dimensional coordinate system motion control cameras in the special effects systems 75. The data produced by each resource, such as the three-dimensional coordinate data of such motion control cameras, is stored by the system into a database for future reference. As is apparent from the various illustrations accompanying this Specification, many of the networks associated with the present invention overlap and are coupled to one another. Accordingly, all the systems represented in the intelligent studio network of FIG. 3, can communicate with the resources and workstations located on the network of FIG. 5.

Figure 6:
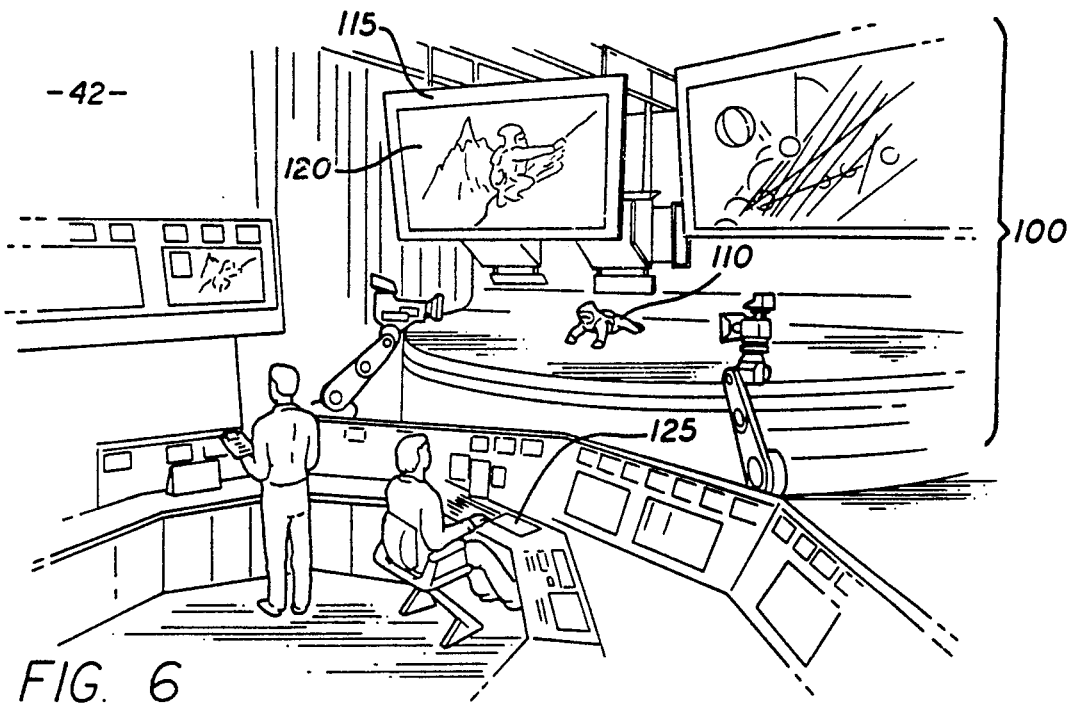
FIG. 6 is an artist's illustration of one use of the invention to integrate a live action production with special effects and/or outdoor scenes, without the need for the actor to be placed in the actual environment depicted in the scene.

FIG. 6 is an artist's rendition of a sample of the use of the production systems network of the present invention. As illustrated, a production sound stage 100 includes an actor 110 wearing mountaineering equipment. A display screen 115 is included within the production facility illustrated in FIG. 6. A background mountain scene generally referred to by the numeral 120 comprises motion picture film or video tape previously shot at a remote location. As will be apparent from the discussion which follows, the present invention permits the super-position of the actor 110 onto the background scene 120. The actual super-position of the actor 110 into the background is accomplished by a user using an edit workstation 125 incorporating the teachings of the present invention's user interface disclosed in the '821 parent application. (Also see Applicant's copending application, Ser. No. 07/622,694, filed Feb. 27, 1991, hereinafter the "'694 parent".) The resulting images are available for use by other producers working on other workstations connected to the network system. Thus, a series of edits can be accomplished by different producers working at different workstations in real-time. It will be appreciated by one skilled in the art that the ability to "insert" the actor 110 into the background scene 120 on a real-time basis and have the resulting images immediately available to other producers by using the present invention's network topology permits multiple edits to be performed quickly and efficiently. For example, utilizing the teachings of the present invention, actor 110 may be inserted into the background scene 120 and then background music may be inserted by others, as will be described more fully below.

Figure 7:
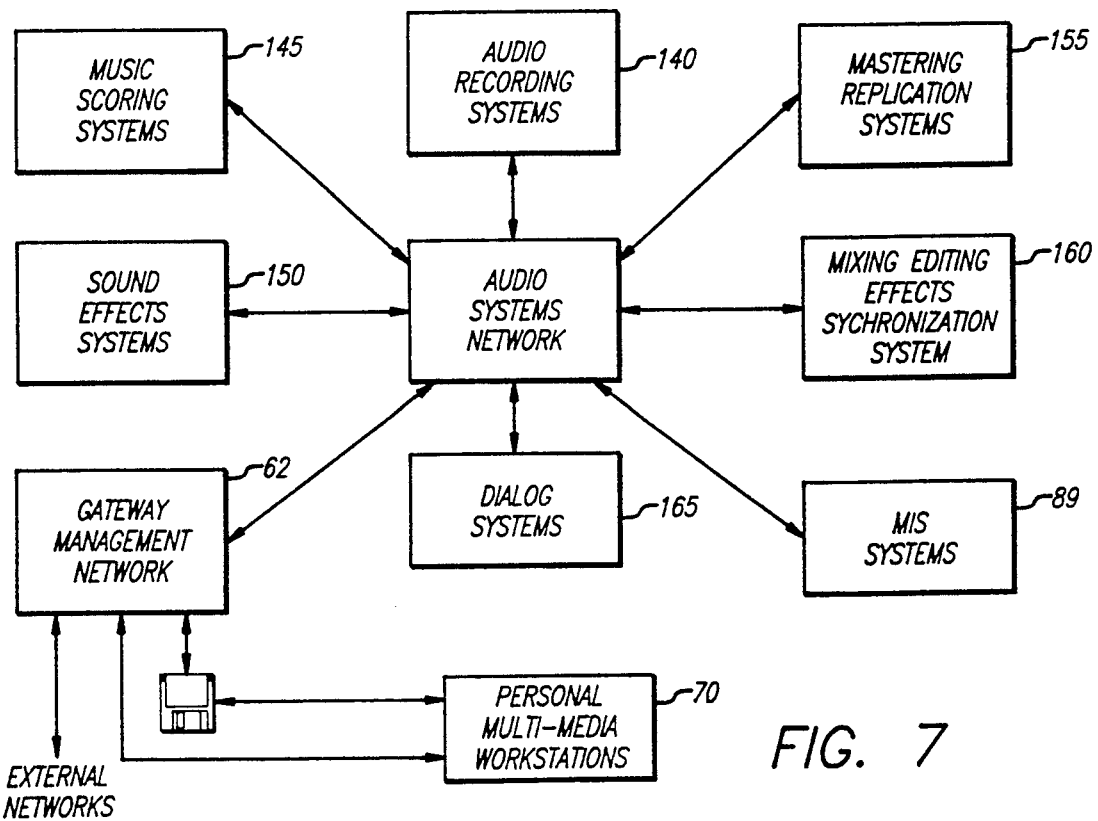
FIG. 7 is a more detailed block diagram of the audio systems network comprising the present invention.
Figure 8:
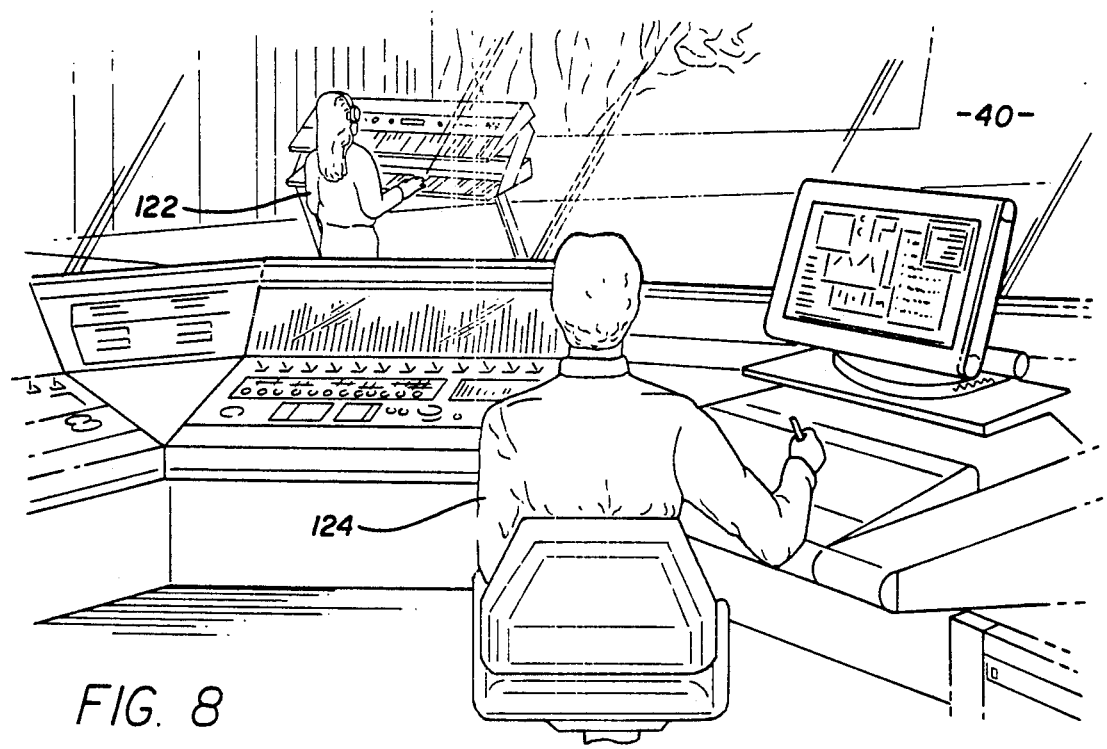
FIG. 8 is an artist's illustration of a studio incorporating the teachings of the present invention for the generation and integration of audio components into a production utilizing the present invention's common user interface.
Figure 9:
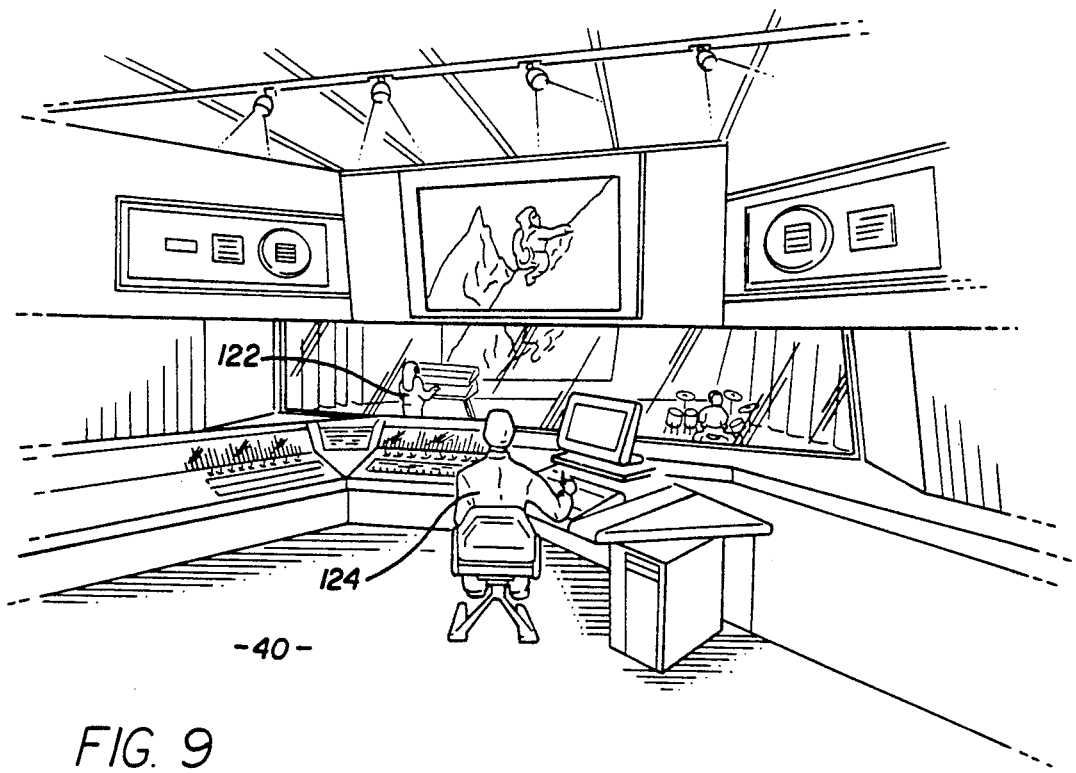
FIG. 9 is an artist's illustration of a production studio incorporating the teachings of the present invention for the generation and integration of audio components into a production utilizing the present invention's common user interface.

Referring now to FIGS. 7, 8 and 9, a possible audio systems network embodiment of the present invention relates to all aspects of audio production and authoring. The audio system network encompasses a variety of functions including audio recording systems 140, such as by way of example audio tape machines, sound stages (See FIGS. 8 and 9) and the like. In addition, the audio systems network includes music scoring systems 145 for arrangement and music publishing, and sound effect systems 150 for various sound effects (such as wind, lightening, etc.). Mastering replication systems 155 are also included within the audio systems network, as is mixing editing and effect synchronization systems 160, and dialog systems 165. The audio systems network can be coupled to a device which comprises a MIDI or similar interface. The audio systems network would then be capable of controlling standardized electronic musical instruments. As shown, the audio systems network is further coupled to the MIS system 89 and the gateway management network 62, as well as to the personal multi-media workstations 70. As in the case of other networks comprising the present invention, the audio systems network resources are coupled to an AV LAN, which is described in more detail later.

Using the example of FIG. 6 and referring to FIGS. 8 and 9, in the case where background music is to be inserted into the scene depicted with the actor 110 and background 120, a musician such as an electronic synthesizer/piano musician 122 may view the combined scene created using the teachings of FIG. 6 while inserting the background music. An operator 124 illustrated in both FIGS. 8 and 9 seated behind a workstation located on the audio systems network directs the actual recording of the music score. Using the graphical user interface of the present invention disclosed in the '821 and '694 parent applications, the operator 124 may selectively insert the music score at the appropriate times into the production. The operator 124 may also insert sound effects from a sound effects library resource located on the audio systems network as appropriate.

Figure 10:
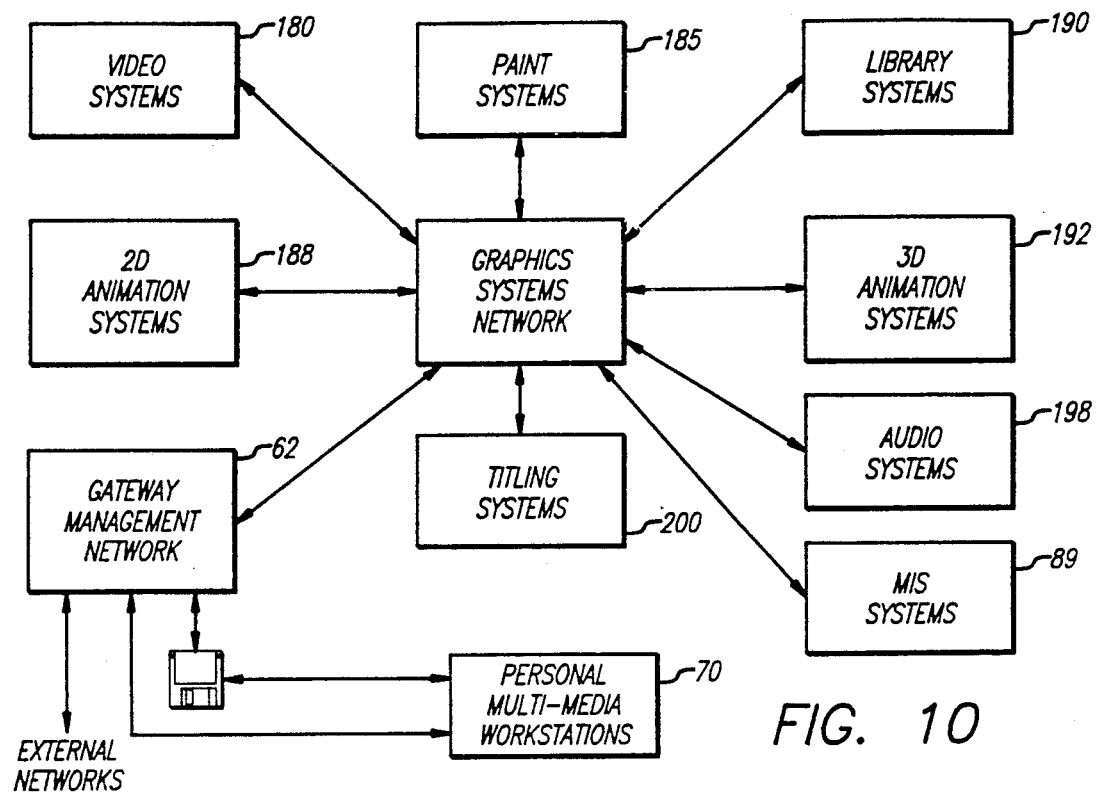
FIG. 10 is a more detailed block diagram illustrating the graphics systems network of the present invention.
Figure 11:
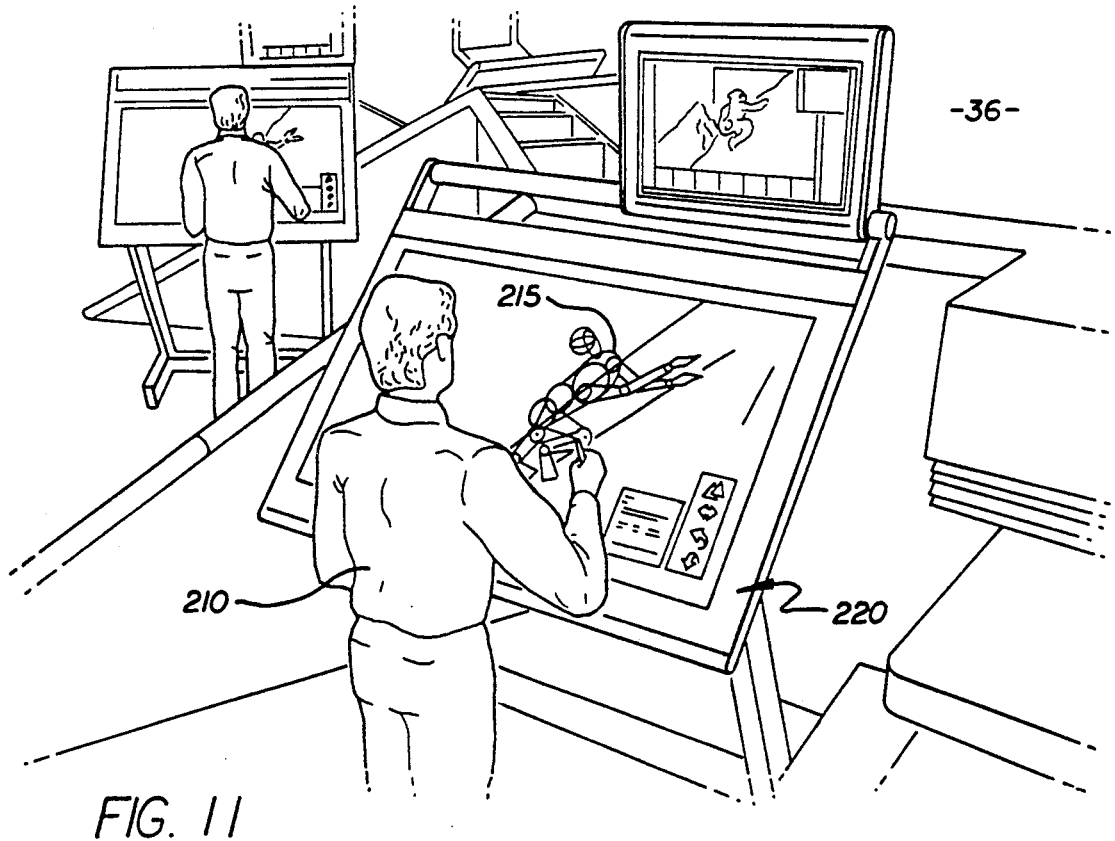
FIG. 11 is an artist's illustration of the integration of graphics into a production utilizing the teachings of the present invention.

Referring now to FIGS. 10 and 11, the present invention further includes a graphics systems network which incorporates many aspects of graphic design environments including, two-dimensional animation, three-dimensional rendering and animation, cell animation and other traditional mediums of graphic design. One of the attributes of the integrated intelligent studio environment (See FIG. 3) of the present invention, is the capability to define relationships between normally unrelated information types. For example, an operator may develop a system to recognize a relationship between a foreground object and a background object. Having trained the system to recognize the foreground object, the system could then automatically extract the foreground information from an image sequence. Another feature could be to provide an image compositing workstation that understands the coordinate space of each image. This would provide a high level relationship allowing the operator to choreograph live action with 3-D and 2-D animation and other effects.

As illustrated in FIG. 10, a graphics systems network embodiment could include resources such as video systems 180, paint systems 185, and 2-D animation systems 188 coupled to an AV LAN topology. Library systems 190 are provided within the graphics systems network such that various graphics may be electronically stored in a database, and accessed by other systems coupled to the graphics systems network, or the integrated user environment at large. 3-D animation systems resources 192 are also coupled to the graphics network, as are the audio systems 198 described with reference to FIG. 7, and the MIS System 89. Various titling systems 200 are coupled to the graphics systems network, as are the gateway management network 62 and personal media workstations 70.

As shown in FIG. 11, a graphic artist 210 may design various graphic images 215 using, for example, the 3-D animation system resources 192, and generally referred to by the numeral 220 in FIG. 11. Once the three-dimensional images are complete, they may be stored using the library systems resources 190, or inserted into a multi-media production using the graphical user interface of the present invention's copending '821 and '694 parent applications on a workstation.

Figure 12:
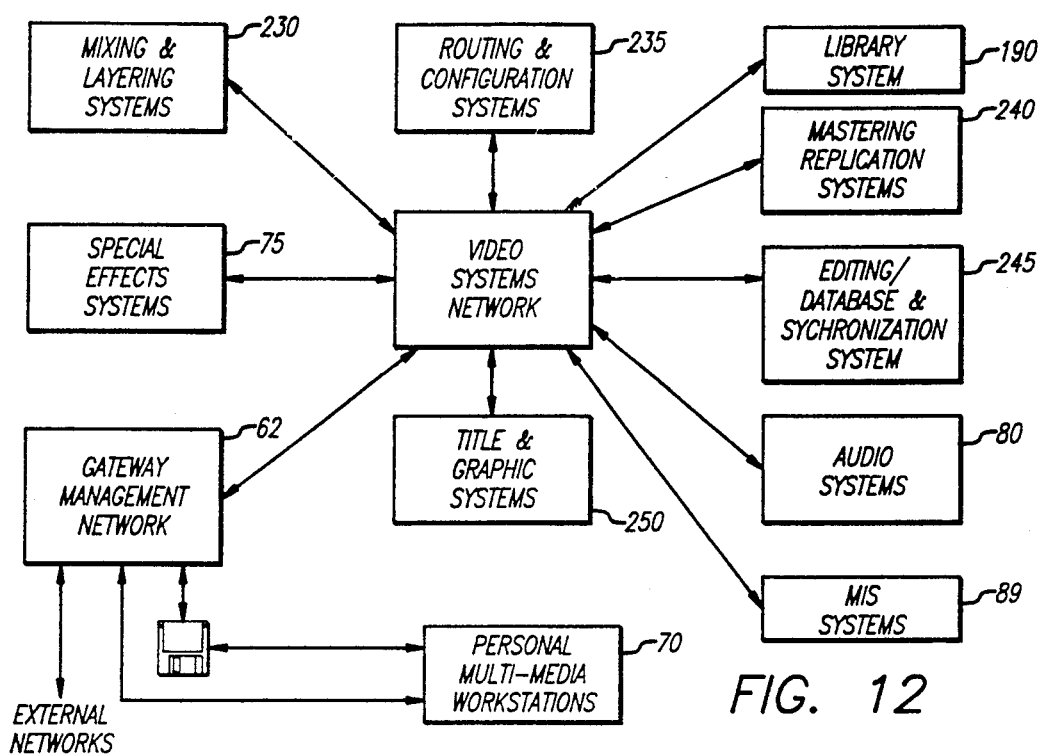
FIG. 12 is a more detailed block diagram of the video systems network comprising the present invention.

Referring now to FIG. 12, a possible embodiment of a video systems network is disclosed. The disclosed video systems network includes resources used in the recording, editing and duplication of video programs. The video systems network integrates the video, audio, and graphic elements of the multi-media production, through the use of a workstation implementing the common graphical user interface of the present invention's parent applications. A user accesses and controls the necessary video production resources using the workstation, which sends out the appropriate commands over the AV LAN (See FIG. 18). Accordingly, multiple versions of a sequence of a multi-media production may be created and tested in a shorter time frame than otherwise possible using prior art production methods. As illustrated in FIG. 12, the video systems production network includes mixing and layering systems resources 230, routing and configuration systems resources 235, mastering replication systems resources 240, and editing/data base and synchronization systems 245. In addition, the video systems network is coupled to the special effects systems resources 75 and audio systems resources 80. The title and graphics systems 250 are also provided, as is network interconnect between the MIS System 89 and the gateway management network 62 and personal multi-media workstations 70.

By having access to standardized or custom databases, such as library systems 190 and other resources, the video systems network using the present invention's unique user interface permits efficient video editing of multiple takes, versions, and production segments.

Figure 13:
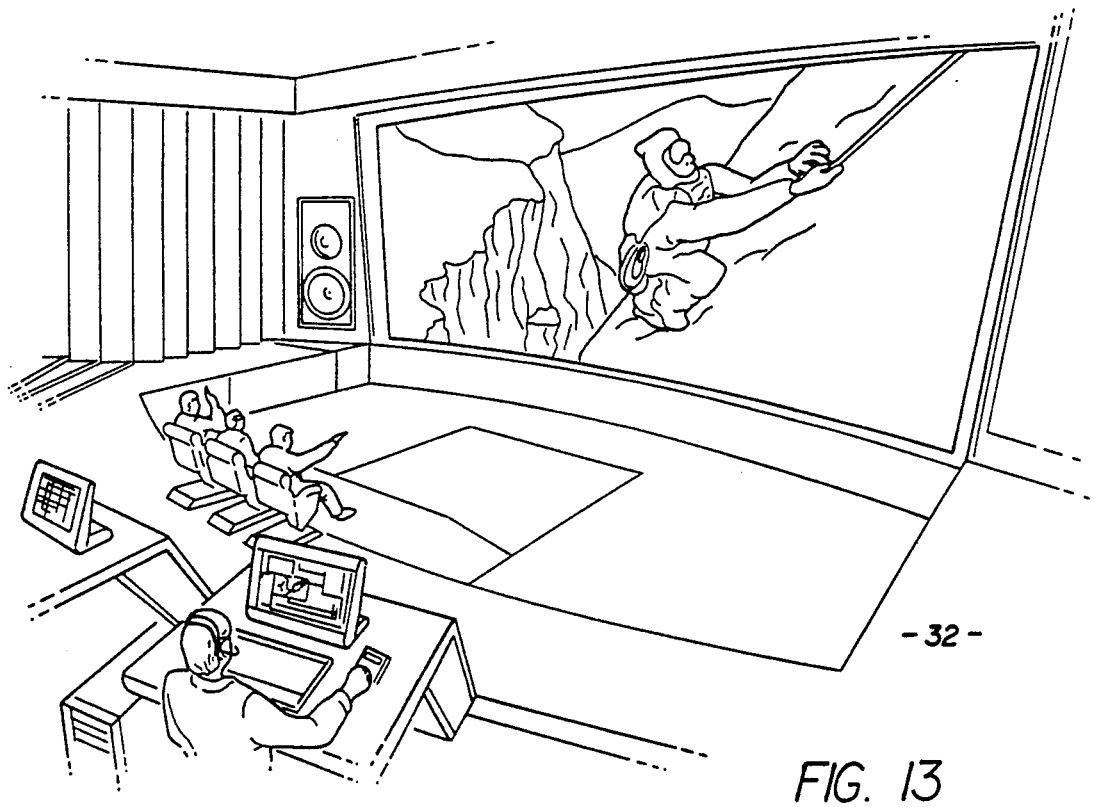
FIG. 13 is an artist's illustration of a situation room encompassing control of all networks and resources in the facility for final editing of audio, video, special effects and other resources in a final feature.

Referring to FIG. 13, a situation room which has access to the video systems network is illustrated. In FIG. 13, a group of directors are making edit decisions and directing a group of users in the final editing of a multi-media production. The users are able to access audio elements, video elements, special effects, and other multi-media elements from the resources present on the video systems network AV LAN through the common intuitive user interface presented on their workstations.

Figure 14:
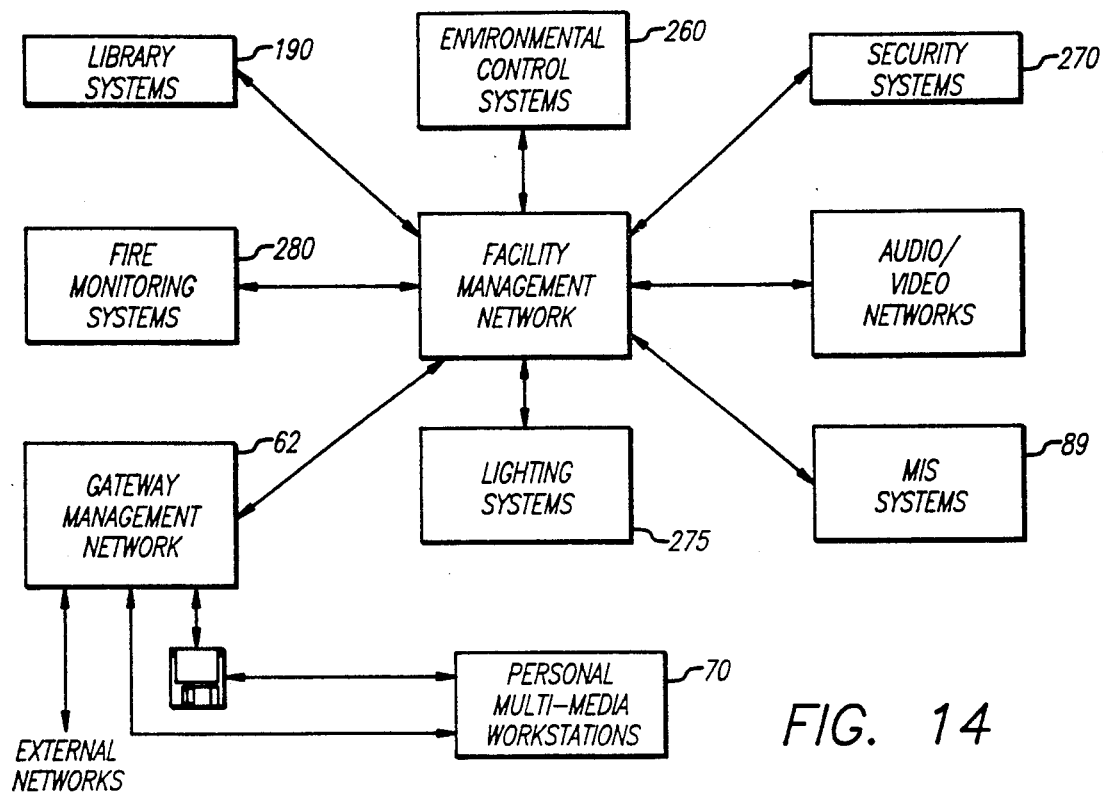
FIG. 14 is a more detailed block diagram of the facility management network comprising the present invention.
Figure 15:
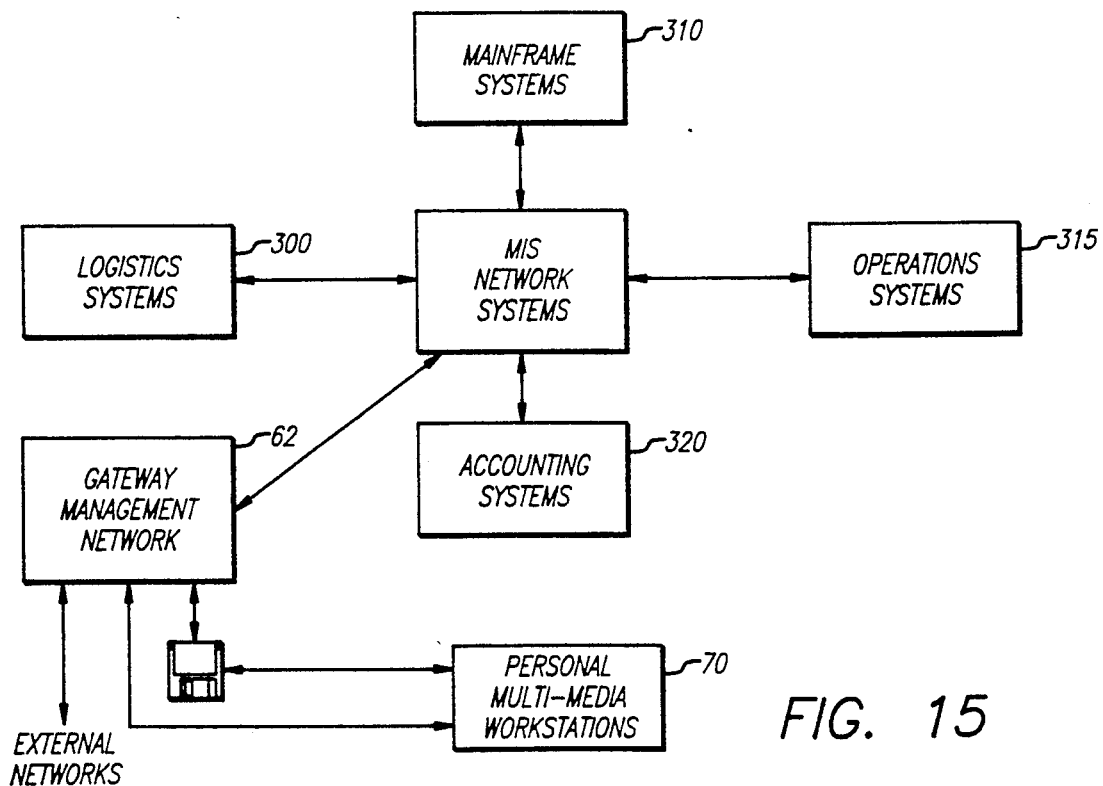
FIG. 15 is a more detailed block diagram of the management information systems network comprising the present invention.

With reference now to FIG. 14, the facility management network is illustrated. Although the AV LAN network is generally geared towards the control of multi-media production resources, the AV LAN can be used to control just about any electronic device that can be connected a computer network. Parameters such as temperature, lighting levels, ambient noise, fire alarms, elevators, security and others can be controlled by a facility configuration network and monitoring workstations. A possible implementation of facility control would be to incorporate intelligent device control logic into every device using a system such as the Lon Works TM system by Echelon of Palo Alto, Calif. Having command and status communications with all the facility controls permits the present invention to store a complete facility configuration. This enables operators to store their particular preferences for various parameters and recall the preferences at future sessions. These preferences include parameters such as system routing, patching, ambient room light level, room temperature, food preferences for actors and staff and any other aspect of a session. As illustrated, the facility management network is coupled to the database library systems resources 190, environmental control systems 260, security systems 270, and lighting systems 275. In addition, the facility management network is coupled to fire monitoring systems 280, and the audio/video networks described with reference to FIGS. 7 and 12. As with the other networks, the facility management network is coupled to the MIS Systems 89 and gateway management network 62, as well as to personal multi-media workstations 70.

Figure 16:
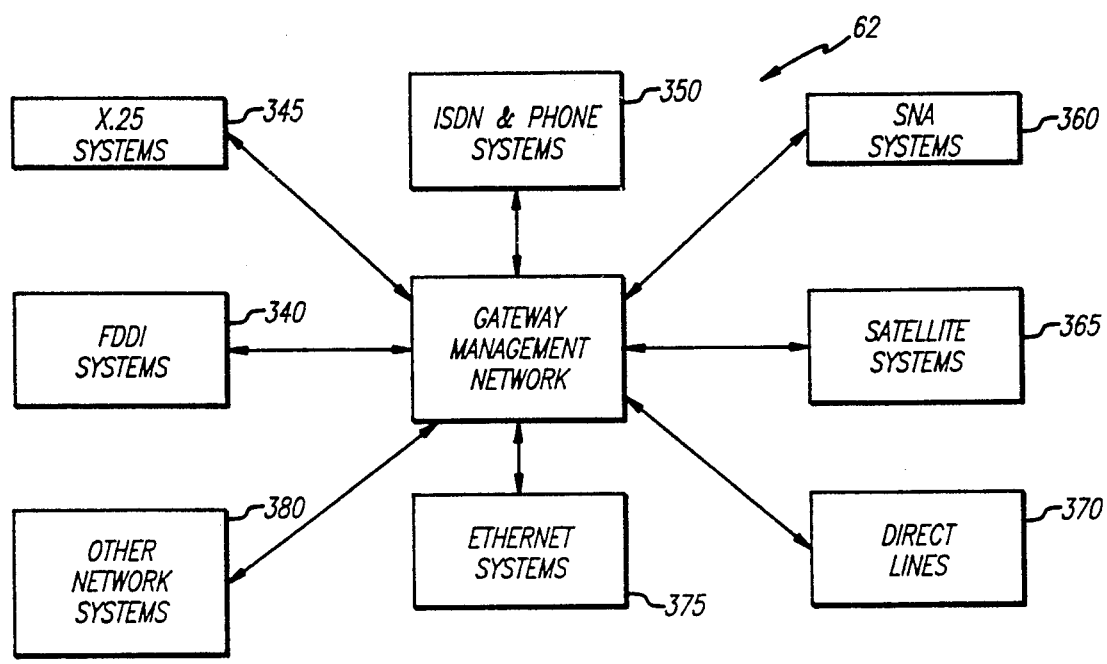
FIG. 16 is a more detailed block diagram of the gateway management network comprising the present invention.

Referring to FIG. 16, the MIS Network Systems 89 is disclosed in more detail. All aspects of logistics and operations may be accommodated by an MIS System. For example, one function of the MIS Network System 89 would be to provide the budget information for a production from the initial conception to the final release. Other aspects of logistics and operations would provide valuable information for project management, and act as a significant asset in building a knowledge base for use by an expert system. As shown, the MIS Network Systems 89 comprise, and is coupled to, logistics systems 300, mainframe systems 310, operation systems 315, and accounting systems 320. As is the case with the other networks comprising the present invention, the MIS Network Systems 89 is coupled to the gateway management network 62 and personal multi-media workstations 70.

Referring to FIG. 16, the gateway management network 62 has a primary function to coordinate the external communications with the intelligent studio network (See FIG. 3). These external communications may range from various electronic mail services over a phone line, to high definition video signal transmission over a fiber optic link. The gateway network management system also provides security for external connections. Moreover, as previously discussed, the intelligent studio of the present invention may be accessed by and effectively used by workstations located at remote locations. This decentralization of resources could extend to the various producers' homes. For example, it is possible for a producer to have the "master" tapes of a production at a post production house, and after completing an off-line session on the producers' personal multi-media workstation 70, the producer allocates the equipment required at the post production facility and performs the edit session from his home or office. This approach maintains the quality of the imagery through the use of high quality studio equipment located at a remote site. As illustrated, the gateway management network 62 utilizes a standard consistent AV LAN protocol, but includes access to FDDI Network Systems 340, X.25 Systems 345, ISDN Phone Systems 350, SNA Systems 360, Satellite Systems 365, direct phone lines 370, Ethernet TM Systems and Interfaces 375, as well as other network systems resources 380 as required.

With respect to the personal multi-media workstations disclosed in the figures, the purpose of the workstations is to empower the individual producer to generate ideas and formulate decisions on a personal basis at home or in the office. The producer can access any of the production resources available on the AV LAN through an intuitive graphical user interface to create, edit, and store multi-media productions. Of course, more traditional computer software such as word processing, spreadsheet, and accounting software is also available to the user. The individual edit workstations ideally comprise high performance UNIX TM based workstations such as Sony NEWS workstations or workstations manufactured by Sun Microsystems, Inc. of Mountain View, Calif. However, the scalable nature of the present invention allows an "edit workstation" to comprise any computer system connected to the AV LAN from a personal computer to a super-computer.

Implementation of the AV LAN

Figure 17:
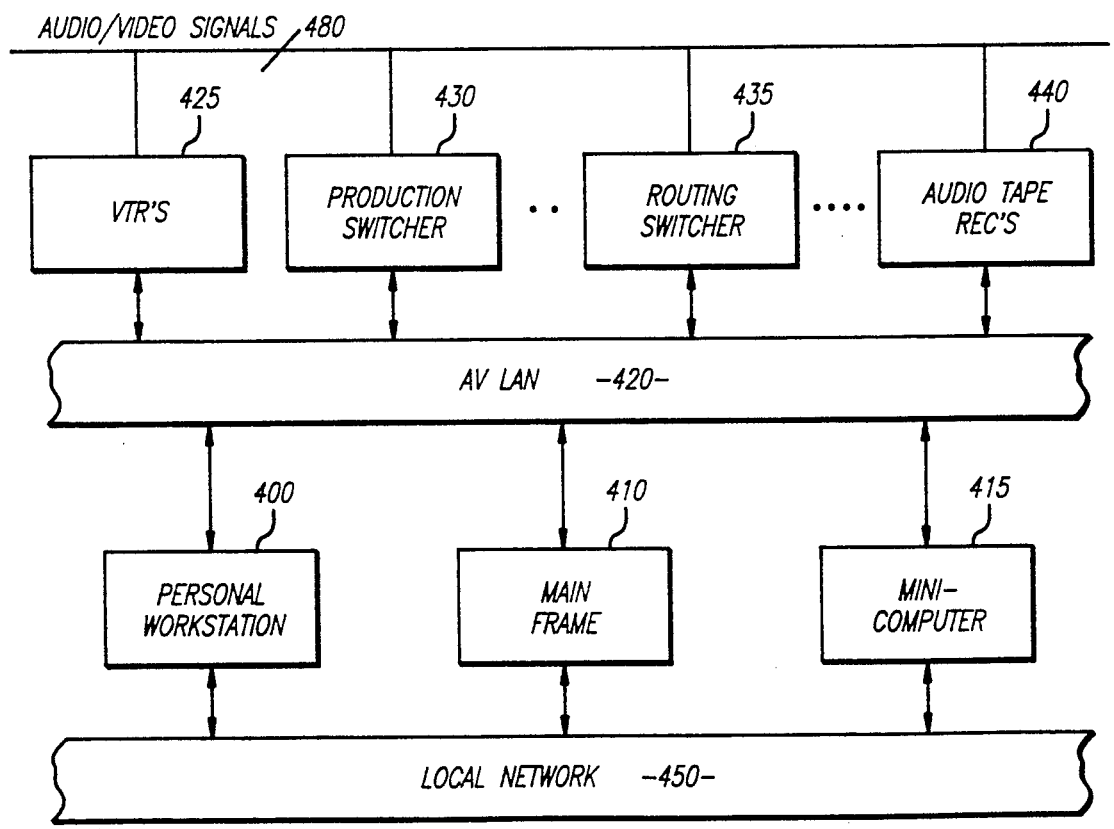
FIG. 17 is a block diagram illustrating the present invention's use of an AV LAN for coupling a plurality of resources to workstations and the use of another standard computer network for connecting the workstations.

Referring to FIG. 17, the networks of the present invention used to control production resources, such as the audio systems network of FIG. 7, the graphics systems network of FIG. 10, or the video systems network of FIG. 12 communicate over a real-time control network referred to as an AV LAN 420. FIG. 17 is a simplified block diagram of a generic network system comprising the present invention. As illustrated in FIG. 17, many different types of computers may be coupled to the AV LAN 420 such as personal workstation 400, a mainframe system 410 and/or a mini-computer system 415. As illustrated in FIG. 17, the computers 400, 410 and 415 are coupled to an AV LAN network 420, which will be understood to comprise the networks disclosed in the previous figures, such as the video systems network, audio systems network and the like. Also coupled to the AV LAN 420 are various production resources such as video tape recorders 425, production switchers 430, routing switchers 435, and audio tape recorders 440, as well as a plurality of other resources. The audio and video signals 480 of the production resources are all coupled to routing switcher 435 which directs the audio and video signals signals as necessary. Examples of other resources which may be coupled to the AV LAN 420 include resources such as paint systems 185, library database systems 190, video systems 180, and other production resources previously described with respect to the various networks associated with the present invention in FIGS. 5, 7, 10, 12, and 14. In addition to the AV LAN 420, the computers 400, 410 and 415 are coupled to a standard computer local area network 450. The local area network is used for non-real time communication between computers 400, 410 and 415 such as data transfers, command transfers, and other operations.

The AV LAN 420 comprises a high-speed digital communications network with a data transmission rate greater than 100 Megabits per second. In the presently preferred embodiment, the AV LAN 420 comprises a FDDI (Fiber Distributed Data Interface) digital computer network. The AV LAN network 420 is used for real-time control of production resources, and includes three separate time references. An absolute reference is maintained by all resources coupled to the network, such that data may be time stamped and operations and devices synchronized. In this manner, techniques such as "sync rolls", where prerecorded images from multiple camera angles are provided simultaneously and in sync, can be accomplished with minimal traffic on the network. A time update feature is provided to avoid the need to retransmit information in what is referred to as a "relative offset" mode, and variable references are provided which are dependent on the particular resources accessed by the network. In addition, well known standards such as SMPTE time codes are used as a standard among the various resources, such as video tape recorders 425, audio tape recorders 440, etc. for synchronization purposes and communication purposes. Moreover, the particular protocol utilized by AV LAN 420 to communicate with the edit workstation 655 and various resources coupled to the AV LAN 420, may be a customized protocol or a commercially available protocol.

IMPLEMENTATION OF THE WORKSTATIONS

Figure 18:
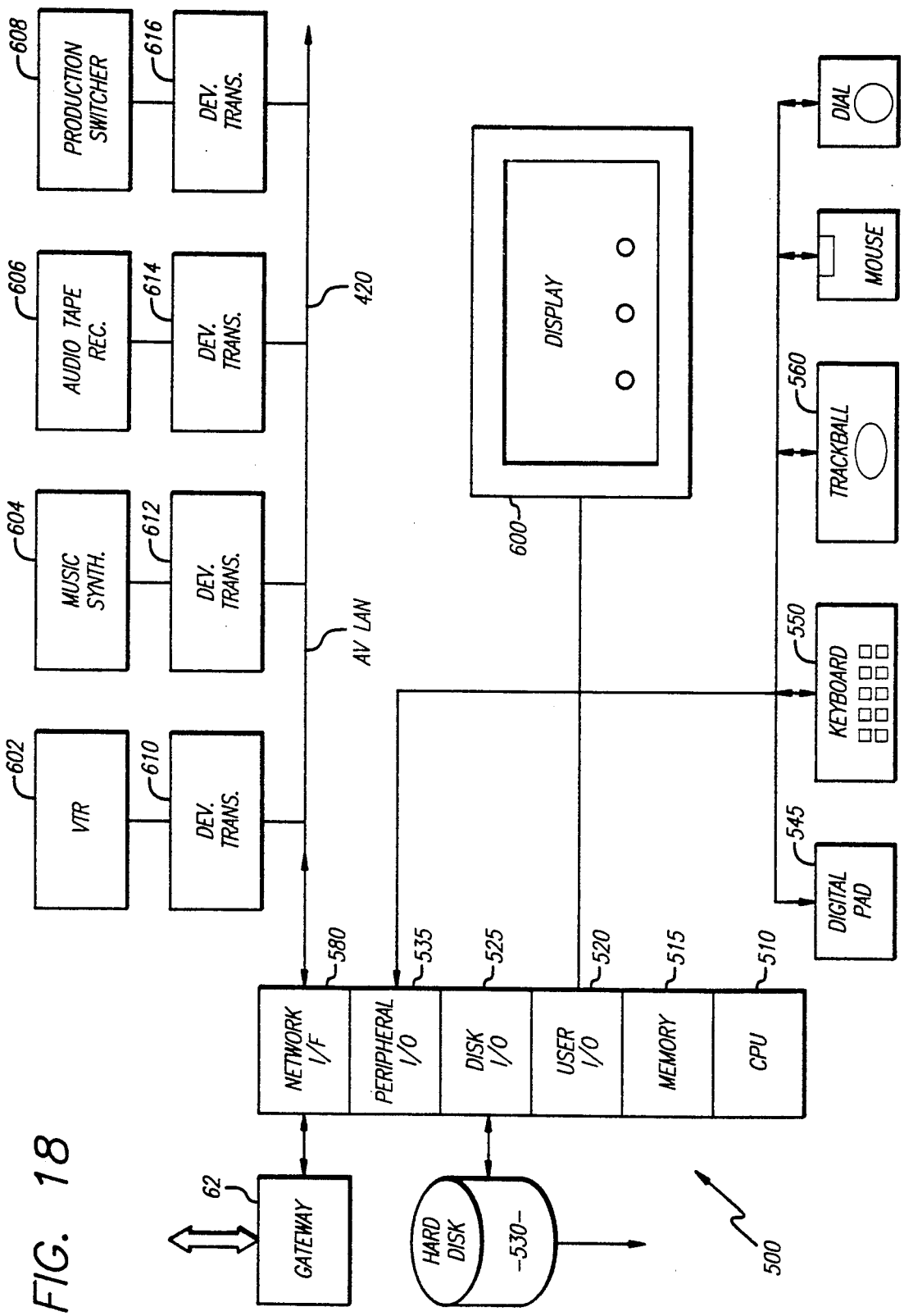
FIG. 18 is a detailed block diagram showing one possible implementation of a workstation for use in the present invention.

With reference to FIG. 18, a detailed embodiment of a possible workstation employing the teachings of the present invention is disclosed. As illustrated, the workstation is a computer 500, which comprises six major components. The first of these is a Central Processing Unit ("CPU") 510 which is coupled to a memory 515. CPU 510 and memory 515 are further coupled to a disk input/out (I/O) circuit 525, for communicating with a hard disk drive 530 for mass storage of data. Computer 500 further includes a peripheral input/output (I/O) circuit 535 for communicating with external assignable input devices over bus 540. Possible external assignable input devices include digitizing pad 545, keyboard 550, and track ball input device 560. A display monitor 600 is illustrated which is used to display the graphical user interface of the present invention, as disclosed more fully herein and is the subject of copending '821 and '694 parent applications. The display monitor 600 is coupled to the user interface display circuit 520.

Computer 500 also includes a network interface circuit 580, which permits the computer 500 to communicate with any of the resources located on the AV LAN 420 or to other devices located on other network systems through the gateway management network 62. Also as illustrated, a variety of production resources such as a video tape recorder (VTR) 602, music synthesizer 604, audio tape recorder 606, and production switcher 608 are coupled to the AV LAN network 420 through their respective device translators 610, 612, 614, and 616, respectively. As will be described more fully below, the present invention as illustrated in FIG. 18 permits media elements from production resources such as VTR 602, music synthesizer 604 and audio tape recorder 606 to be accessed by using the present invention's graphical user interface. A user/producer viewing the graphical user interface on display 600 may utilized one or more of a variety of assignable input devices, such as keyboard 550 or trackball 560, to select and control the various media elements in order to develop a unified multi-media production. In addition to the various assignable input devices illustrated in FIG. 18, other external input devices may be utilized such as a variable scale input device which is the subject of a copending application assigned to the assignee, Sony Corporation of America, and having Ser. No. 07/622,727, filed Dec. 15, 1990, and incorporated fully herein by reference. A variable scale rotary switch, also the subject of a copending U.S. patent application assigned to the assignee of this application having Ser. No. 07/679,745, filed Apr. 3, 1991, may be used as an input device. Moreover, various input devices may be combined into a unified control console as disclosed in copending design patent application entitled "Control Console", Ser. No. 07/718,819, filed Jun. 21, 1991, and assigned to the assignee of the present application.

It will be appreciated that the workstation of the present invention, as illustrated in FIG. 18, is only one possible embodiment of many. For example, although only one computer 500 is shown, the present invention may include multiple workstations coupled to the AV LAN 420. Each of these workstations coupled to the AV LAN 420 may execute separate programs, and support different versions of the user interface of the present invention. In addition, each of the workstations coupled to the AV LAN 420 may operate quite independently of one another with respect to resources coupled to any one of the plurality of networks (for example, the graphics systems network or audio systems network, etc., illustrated in FIGS. 5, 7, 10, 12, and 14). It is contemplated that the use of multiple workstations will support the present invention system distributed computing, wherein multiple versions of the present invention's user interface may be supported concurrently, each of the multiple user interfaces executing different processes but having a common database of resources. As such, it will be noted that the embodiment shown in FIG. 18 is a simplified embodiment for purposes of illustration only, and is not meant to limit the present invention's utility.

PRODUCTION RESOURCES AND DEVICE TRANSLATORS

Figure 19:
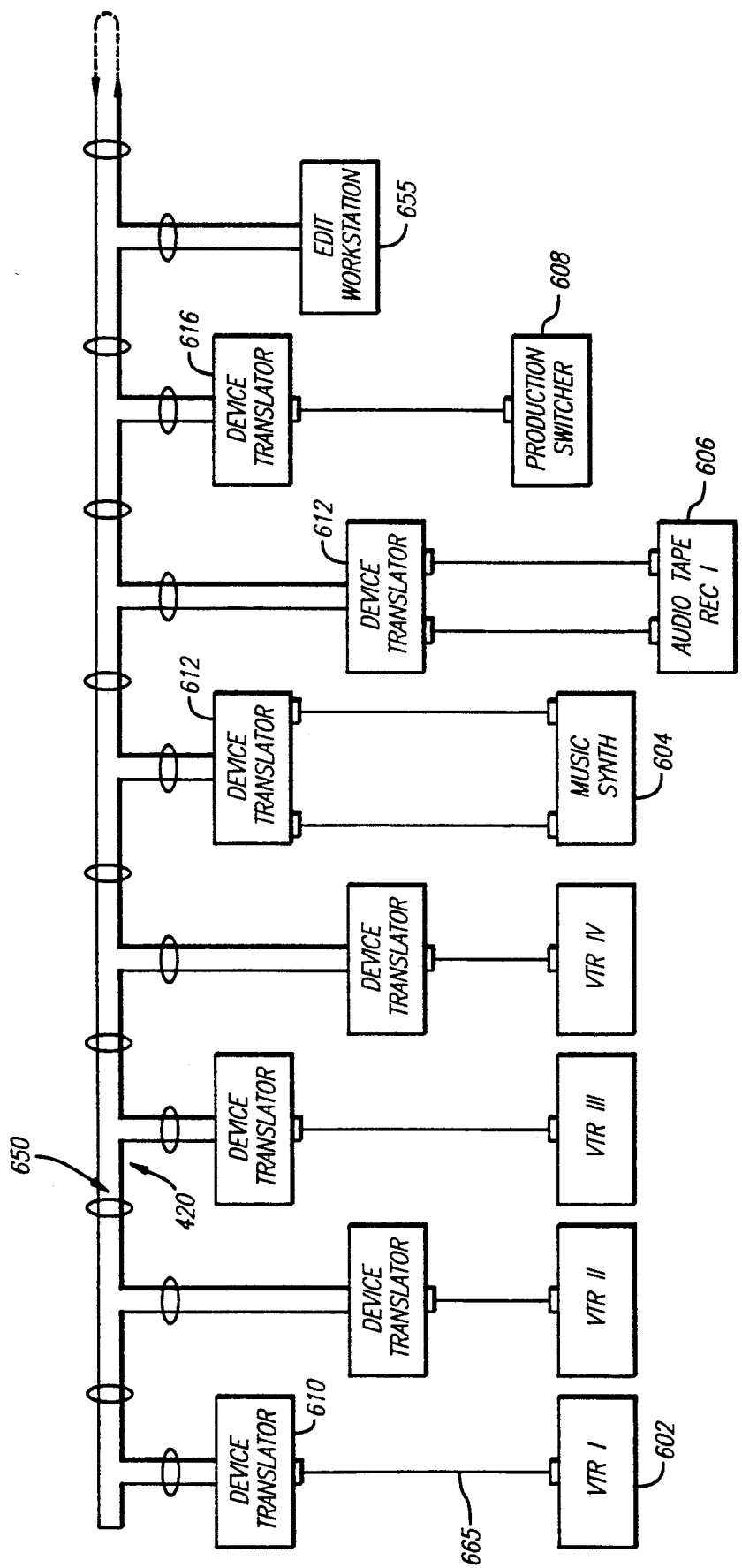
FIG. 19 is an illustration of several production resources coupled to the present invention's AV LAN through the use of device translators.

Referring now to FIG. 19, a more detailed block diagram illustrating the AV LAN 420 of the present invention is shown. In FIG. 19, an edit workstation 655 (Such as the computer 500 of FIG. 18) is coupled to the AV LAN 420 which allows the workstation to access the numerous production resources located on the AV LAN 420. Edit workstation 655 corresponds to personal workstation 400, or alternatively, to mainframe 410 or mini-computer 415 of FIG. 17. Each of the production resources coupled to the AV LAN 420, such as VTR I 602 or music synthesizer 604, are coupled to the AV LAN 420 through an associated device translator, which will be described below. The coupling between the device translator and the production resource varies depending on the nature of the production resource. For example, in the case of a video tape recorder 602, in the presently preferred embodiment line 665 comprises a 38.4K baud RS-422 SMPTE standard serial connection. However, it will be appreciated that other couplings, such as a RS-232 serial connection, a parallel connection, or a MIDI connection for standardized musical instruments, may be used to couple the various production resources to their respective device translators.

Figure 20:
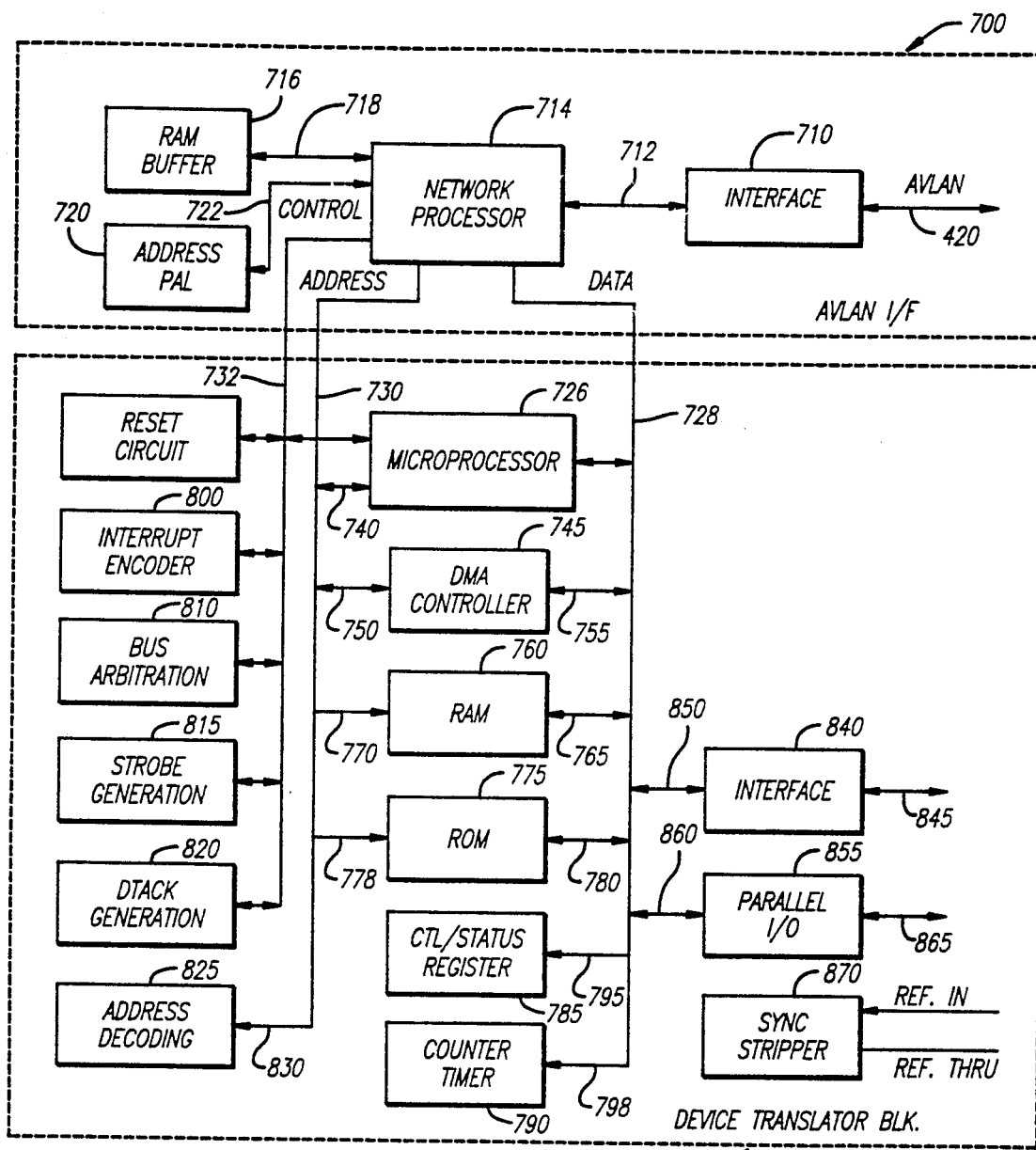
FIG. 20 is a detailed block diagram of the internal workings of a device translator employed by the present invention.

Referring now to FIG. 20, a detailed block diagram of a possible device translator (Such as 612 from FIG. 19) embodiment is shown. As illustrated, the device translator comprises two main functional blocks, the AV LAN interface block 700 and the device translator block 724. The AV LAN interface 700 includes a network interface circuit 710 which is coupled to a network processor 714. The network processor, as is known in the art, controls the transmission and receipt of messages on the AV LAN 420 network. A RAM buffer 716 is coupled to the network processor 714 for storing incoming and outgoing AV LAN communication messages. In addition, a programmable array logic (PAL) device 720 is coupled to the network processor 714. The PAL 720 identifies the network address associated with the particular device translator and production resource. Commands and data transmitted over AV LAN 420 are directed to one or more network addresses associated with the various production resources. The command message may consist of a single command or contain a series of automatic events which are to be executed by the device on a time-line. Only the messages directed to the appropriate network address as stored within the network address PAL 720 are captured by the network processor 714. These messages are then forwarded to the circuitry located in the device translator block 724 which translates the received message into specific device commands for the production resource associated with the device translator.

The device translator block 724, as illustrated in FIG. 20, includes a microprocessor 726 which translates and converts commands and data transmitted over the AV LAN 420 into the device specific command types and formats required by the particular resource to which the device translator is coupled. For example, commands transmitted to a video tape recorder could be translated into the commands PLAY, RECORD, FAST-FORWARD, REWIND, JOG, STILL, and STOP. Each type of production resource has its own set of ballistics factors which define the dynamic performance of the device. For example, the acceleration from STOP to RECORD speed, the wind-motor speeds, and reel sizes are ballistics factors which define the performance of a video tape recorder. These ballistic factors vary among models and manufacturers. To a lesser degree, even identical models from the same manufacturer will differ slightly. To compensate for these different characteristics, each production resource has its own dedicated device translator software that is specially tailored.

In the presently preferred embodiment, the microprocessor 726 comprises a Motorola MC680x0 microprocessor. In addition, as illustrated in FIG. 20, microprocessor 726 is coupled using a 32-bit bus to a address bus 730 over lines 740. As illustrated in FIG. 20, a direct memory access (DMA) controller 745 is provided within the device translator, and is coupled to the address bus 730. In addition, the DMA controller 745 is coupled to the data bus 728. The DMA controller 745 permits fast direct memory access operations. In addition to other DMA operations, the DMA controller 745 permits DMA operations for purposes of protocol translation (i.e., translation of commands, operations and data) for data buffered in a RAM 760 which is also coupled to the data bus 728.

ROM 775 is coupled to the address bus 730 and the data bus 728. The ROM 775 contains the microprocessor code necessary to drive the device translator as a generic translating device. A control/status register 785 and a counter timer 790 are provided as part of the device translator and are coupled to the data bus 728. In addition, other support circuitry is provided within each device translator such as an interrupt encoder 800 which is coupled to the control bus 732. Interrupt encoder 800 provides appropriate interrupt signals to the microprocessor 726 as may be required. A bus arbitration circuit 810 is also coupled to the control bus 732. The bus arbitration circuit 810 arbitrates the bus requests of the various devices located on the bus such as the DMA controller 745, the serial interface 840, and token ring processor 714. A strobe generator 815 is provided and coupled to the control bus 732 for providing appropriate strobe (such as RAS and CAS) signals for memory access and synchronization purposes. Other circuitry disposed within the device translator includes a data transfer acknowledge (DTACK) generation circuit 820, coupled to the control bus 732, and an address decoding circuit 825.

Continuing to refer to FIG. 20, each device translator includes an interface circuit 840 which couples the associated resource (e.g. VTR 602) to the device translator as illustrated. The interface circuit 840 varies depending on the type of resource to be connected. A parallel input/output (I/O) interface 855 is also provided and coupled to the data bus 728. In the presently preferred embodiment, the input to the parallel I/O interface 855 comprises 24-bit parallel lines 865. Finally, a sync stripper 870 is provided within each device translator to appropriately sync strip video signals, as may be required.

In operation, each resource is coupled to one of the an AV LAN 420 networks, such as the audio systems network of FIG. 7 or graphics systems network of FIG. 10, through a device translator as illustrated in FIGS. 18, 19, and 20. In addition, a number of workstations are coupled the AV LAN 420 networks. It will be appreciated from the Specification that a workstation coupled to any of the AV LAN networks may, using the present invention's common user interface, allocate and control the various resources coupled to any of the associated networks. Accordingly, a workstation coupled to, for example, the graphics systems network of FIG. 10, may access a resource such as music synthesizer 604 connected to the audio systems network of FIG. 7. Using a protocol previously defined for use on the AV LAN 420, the workstation (e.g., edit workstation 655) may issue commands such as stop, start, record, fade, etc. The commands issued by a user/producer operating an edit workstation are transmitted along the AV LAN 420. The device translator receives the command transmitted by the workstation (e.g., workstation 655) through the network interface 710 (see FIG. 20). The resource network address contained in the message transmitted over AV LAN 420 is compared to the network address stored within address PAL 720 by the network processor 714. An address match identifies the command as being destined for the music synthesizer 604, in this example. The command is forwarded by the network processor 714 into the device translator RAM 760. The microprocessor 726 then translates the desired command (e.g., stop, start, etc.) from the AV LAN protocol into commands understood and executable by the music synthesizer 604. The translated command is then sent by the microprocessor 726 to the associated production resource (in the present example, music synthesizer 604) through the interface circuit 840, or alternatively, through the parallel I/O port 855.

It will be appreciated by one skilled in the art, that the device translator illustrated in FIG. 20 is a generic translator which may be used for several different types of production resources. Depending upon which resource is coupled to the device translator, a specific translation data set is loaded into the device translator RAM 760. The translation data set is used by the microprocessor to translate the messages received from the AV LAN 420 into commands that can be understood by the associated resource. The translation data set can be downloaded into the device translator over the AV LAN 420 as required for the particular resource. As such, the device translator is designed to act as a universal translating device which can be programmed such that any resource coupled to the device translator will receive commands, data and other instructions in the format required by the particular resource regardless of the protocol utilized by the AV LAN 420 or the binary orders of the workstations themselves (e.g., workstation 655).

Alternatively, a specific translation data set for a particular production resource can be preprogrammed into the device translator ROM 775. By preprogramming the translation data set into the device translator, the AV LAN network maintenance can be simplified and network traffic can be reduced.

An Example AV LAN Network

Figure 21:
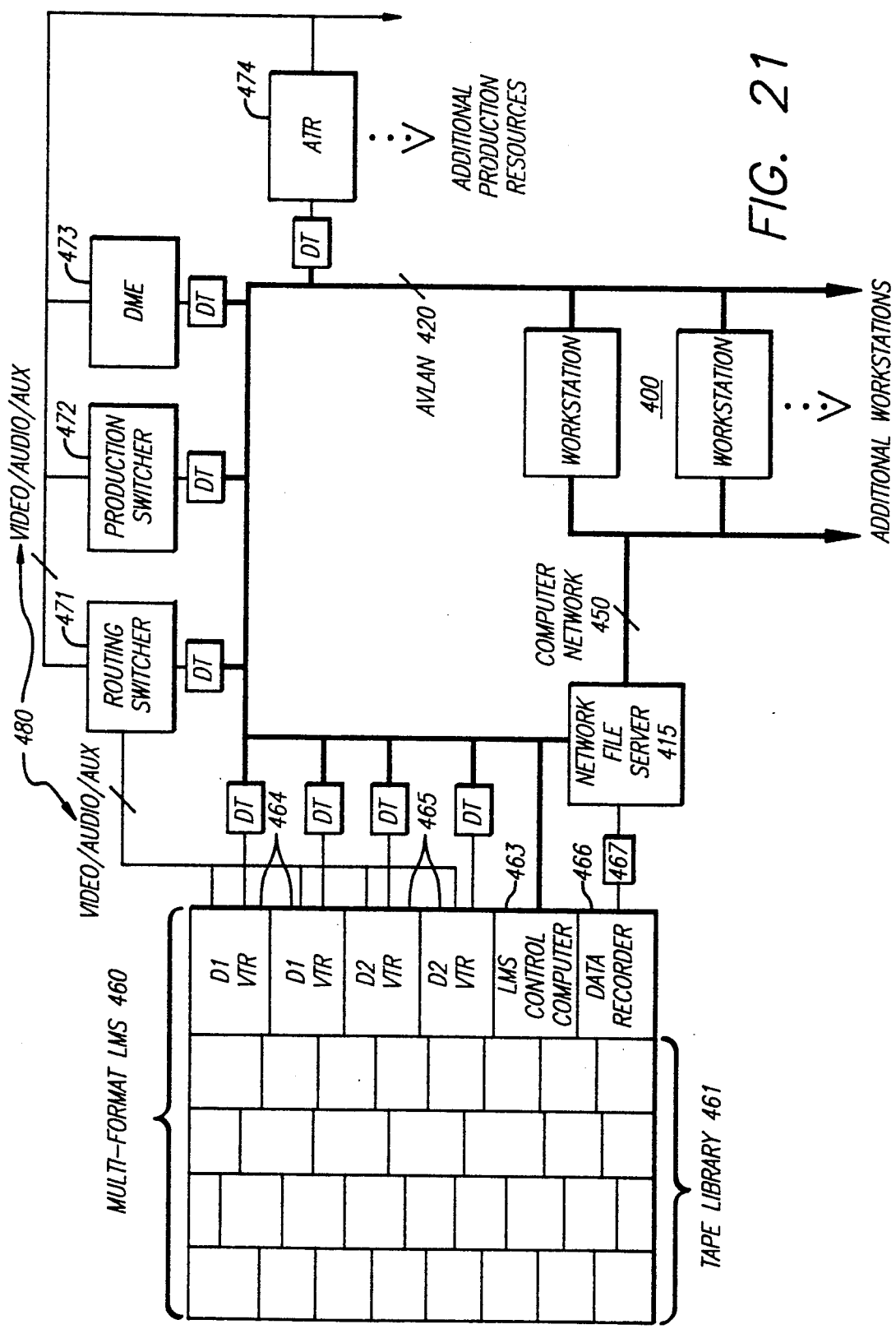
FIG. 21 is a block diagram of a possible embodiment of a video systems network.

To more fully explain the operation of an AV LAN network, a possible embodiment of a video production network is disclosed in FIG. 21. This embodiment is just one possible network configuration and is not intended to limit the invention. Like the AV LAN system of FIG. 19, the AV LAN system of FIG. 21 comprises edit workstations 400 and a set of production resources, such production switcher 472 and Digital Multi-Effects (DME) unit 473, coupled to an AV LAN 420. Each of the production resources such production switcher 472 and Digital Multi-Effects (DME) unit 473 are connected to the AV LAN 420 through a device translator (each labeled "DT") such as the one disclosed in FIG. 20. As previously illustrated in FIG. 17, the edit workstations in FIG. 21 are also coupled to a standard computer network 450 which is used for non-real-time communications. In addition, a network file server 415 is coupled to both the AV LAN 420 and the computer network 450. The audio and video signals 480 of the various production resources are all connected to routing switcher 471 which directs the audio and video signals as needed. The routing switcher 471 directs audio and video signals 480 in response to commands received over the AV LAN 420.

Also coupled to the AV LAN 420 is a multi-format Library Management System (LMS) 460 which serves as the main data storage facility for the video production network of FIG. 21. The Library Management System 460 is made up of a large library of bar-coded 19 mm tapes 461; a collection of different 19 mm tape decks 464, 465, and 466; and a Library Management System control computer 463. A Library Management System 460 is not required for an AV LAN configuration, it is merely one of many possible production resources that can be connected to the AV LAN network. The function provided by the Library Management System 460 could also have been provided by individual video tape decks. However, since the LMS has the capability to provide access to a large number of video tapes simultaneously, the LMS is ideal for broadcast stations or large post-production studios.

The tape library 461 of the Library Management System 460 consists of a number of 19 mm tapes which can be formatted in a number of different formats. Two of the possible tape formats are used for storing video digitally. A first digital video data format is used by "SMPTE D1" video tape recorders (D1 VTR) 464. D1 video tape recorders 464 store video data in a standardized digital component video format entitled "4:2:2". The second type of digital video data format is used by "SMPTE D2" video tape recorders (D2 VTR) 465. D2 video tape recorders 465 store video data in a digital composite video format entitled "4 $f_{sc}$". Another possible format used by 19 mm tapes is a normal digital data format used by "DD1" digital data recorders. Such recorders use formats such as the ANSI X3B.6 ID-1 standard. This is a normal digital data format that is not dedicated for any one specific use. Each 19 mm tape formatted with digital data can store up to 770 Gigabytes of digital information. Each 19 mm tape in the tape library 461 is labeled with a bar-code label that can be read by a Library Management System control computer 463. The barcode label reveals the name of the tape and the format (such as 4:2:2 component video, 4 $f_{sc}$ composite video, or DD1 digital data) of the data contained on the tape. The Library Management System control computer 463 uses the bar-code label to load the appropriate tape into the appropriate tape deck.

The multi-format Library Management System 460 contains a number of 19 mm tape recorders to play the 19 mm tapes in the library. The Library Management System 460 shown in FIG. 21 contains two D1 video tape recorders 464, two D2 video tape recorders 465, and one DD1 digital data recorder 466. The D1 video tape recorders 464 and D2 video tape recorders 465 are each connected to the AV LAN 420 through a device translator (each labeled DT) and are controlled by commands received over the AV LAN 420. The DD1 digital data recorder 466 is coupled to the network file server 410 through a high-speed interface 467 such as a "HIPPI" bus. The DD1 digital data recorder 466 serves mainly as an archival mass storage device.

Loading the individual tapes from tape library 461 into the various tape recorders (464, 465, and 466) is the Library Management System control computer 463. The Library Management System control computer 463 is coupled directly to network file server 410 which directs the LMS control computer 463.

AV LAN Control Software

Figure 22:
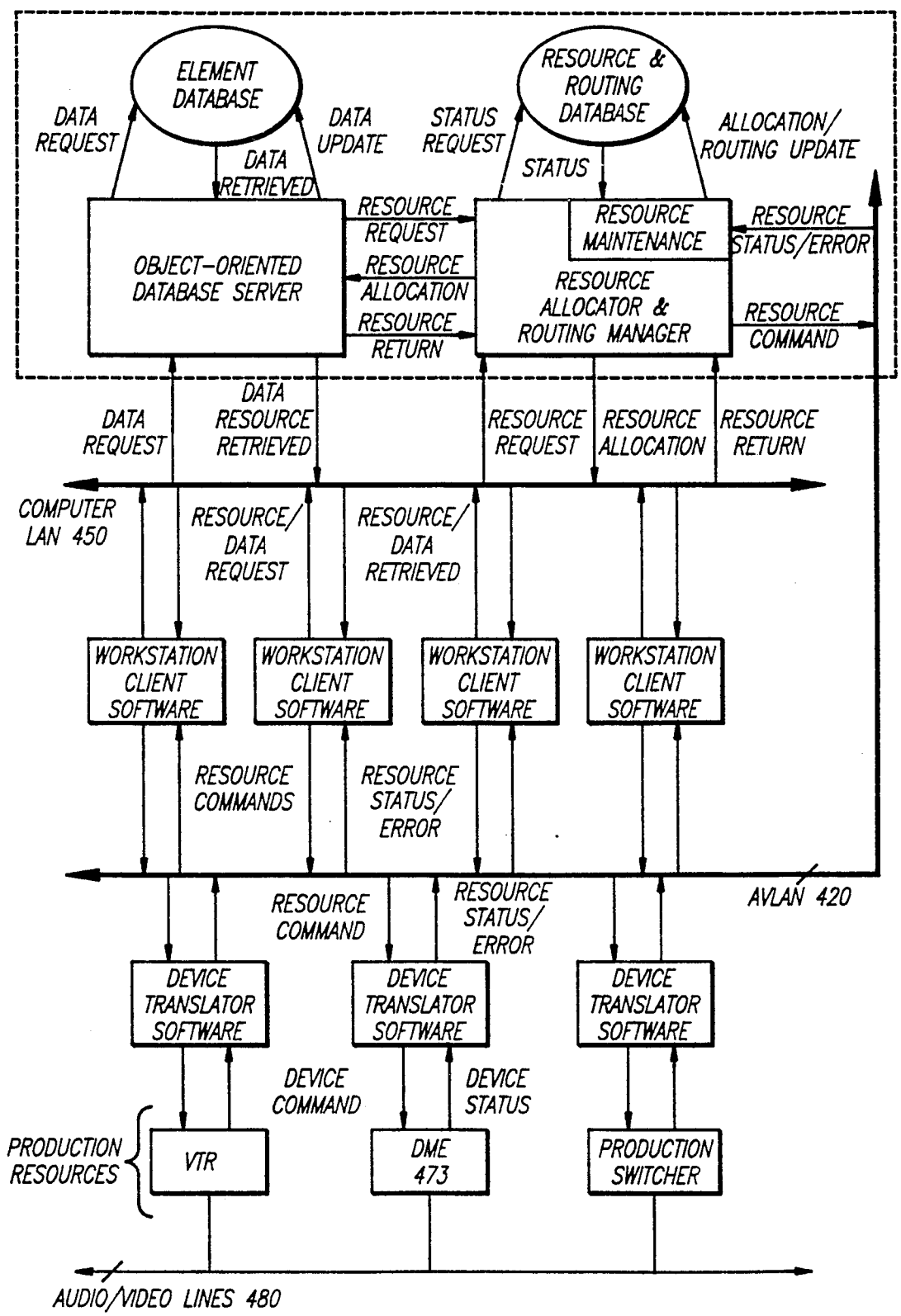
FIG. 22 is a block diagram of the software communications architecture.

Referring to FIG. 22, a block diagram of the software communications architecture is disclosed. On the top of FIG. 22 is a dashed box that represents the network file server 415 of FIG. 21. Two control processes run within the network file server 415 which control the overall management of the particular AV LAN. These two processes act as "servers" to "client" processes running on each edit workstation. The first control process is an Object-Oriented Database Server. The Object-Oriented Database Server is responsible for managing all the data elements created by users of the AV LAN system. Associated with the Object-Oriented Database Server is an Element database which stores all the data elements. When a client process running on an edit workstation requests a data element record, the Object-Oriented Database Server extracts the record from the element database and gives it to the client process.

The second control process running on the network file server 415 is a Resource Allocator and Routing Manager. As the name implies, this control process serves two purposes. The Resource Allocator part of the control process manages the sharing of the various production resources among the users running client processes at each workstation by controlling the allocation of the production resources located on the AV LAN 420. The Routing Manager part of the control process controls the routing of the audio and video signals 480 in FIG. 21 so that when a resource is allocated to a user at a workstation, the audio and video signals are directed appropriately. Associated with the Resource Allocator and Routing Manager is a Resource and Routing database. This database stores the current state of each production resource (free, busy, broken, etc.) and the current routing of the audio and video signals. When a user running a client process at a workstation requests a production resource, the Resource Allocator first checks the database to see if the production resource is available, if it is then the Routing Manager routes the audio and video signals appropriately and gives control of the resource to the client process at user's workstation, such that the user may now use the resource.

Closely related to the Resource Allocator and Routing Manager is a Resource Maintenance program. The Resource Maintenance program examines the resource database and periodically instructs the production resources that are not currently being used to run internal diagnostic tests. In this manner, the health of the production resources located on the AV LAN can be monitored automatically. The Resource Maintenance program can also direct the Routing Manager to connect a production resource's audio and/video output signals to a test device that would monitor the quality of the signals. If the signal quality from the production resource were to deteriorate, the Resource Maintenance program would recommend maintenance on that production resource. In this manner the health and maintenance of all the production resources may be monitored in a well organized manner.

To demonstrate how the AV LAN system software operates, a sample edit session will be explained with reference to FIGS. 21, 22, and 23. In step 1 of FIG. 23, a user initiates an editing session starting a client process on an edit workstation that establishes a software communications link to the Object-Oriented Database Server. The user then "signs on" to the system by entering a user name and password. The Object-Oriented Database Server uses the user's identity to initiate an edit session with the user's preferred settings which were recorded from earlier edit sessions. The user then makes a request for the necessary data which the workstation client process transmits to the Object-Oriented Database Server.

Figure 23:
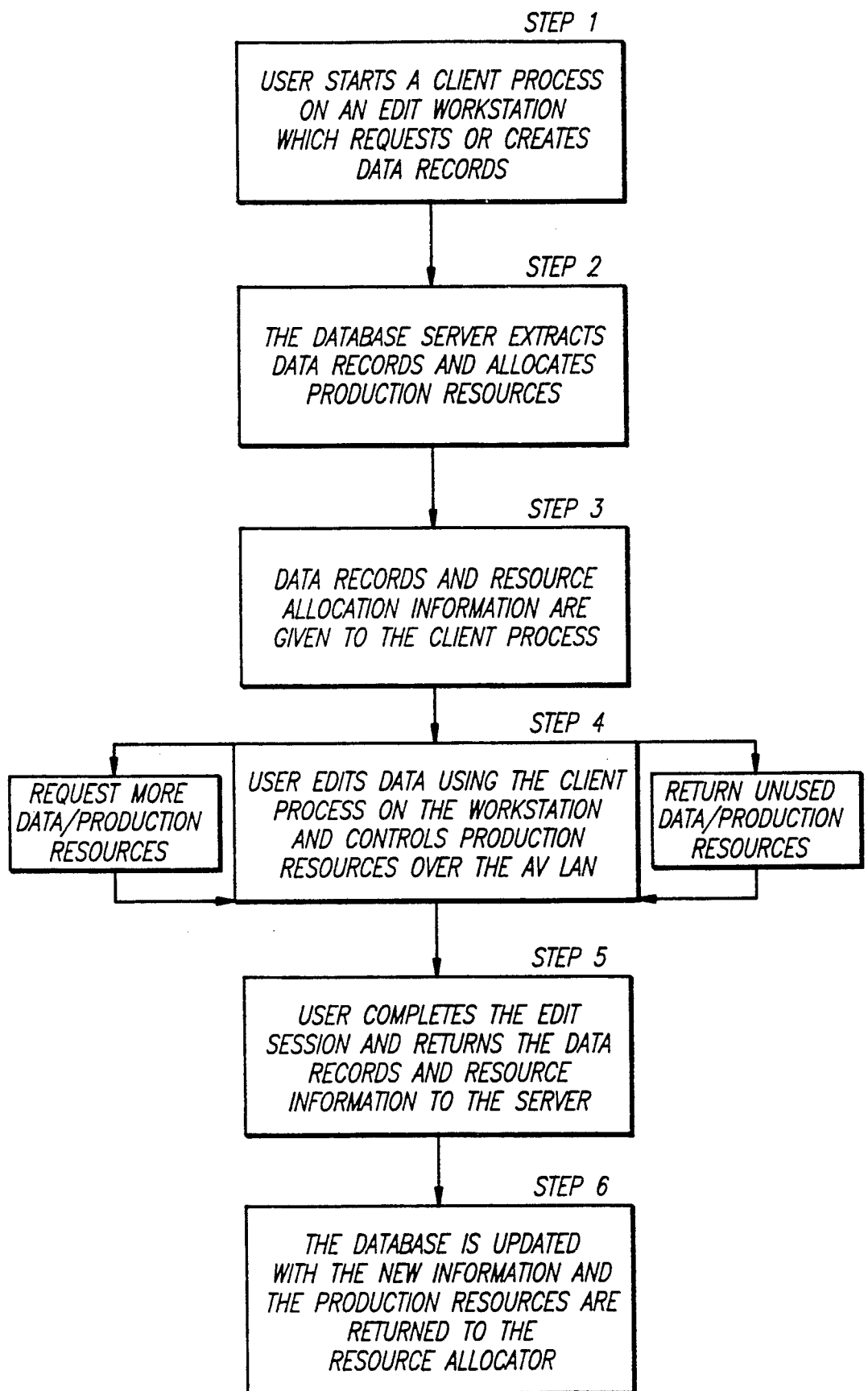
FIG. 23 is a flow chart of a sample edit session using the present invention.

Having received the user's data request, in step 2 of FIG. 23 the Object-Oriented Database Server analyzes the data request and extracts the necessary data records from the element database. If the data records requested also require associated production resources, the Object-Oriented Database Server requests the necessary production resources from the Resource Allocator and Routing Manager. For example, the user may request a video data element that requires an associated video tape recorder. The Resource Allocator allocates the needed production resources and updates the Resource database, marking the allocated resources as "busy". The Routing Manager makes the necessary connections on a routing switcher to connect the allocated production resources together. Information about the allocated production resources is returned to the Object-Oriented Database Server.

After obtaining data records and the production resources, in step 3 of FIG. 23 the Object-Oriented Database Server finally delivers the data records and allocated production resource information to the client software running on the user's workstation. Referring to FIG. 22, the data record and resource allocation information travels from the network server to the client process running on the edit workstation 400 over the standard computer local area network 450.

In step 4 of FIG. 23, the client process running on the edit workstation now has direct control over the data it has received and the production resources allocated to it. The client process can edit and modify the data records it has received within the edit workstation. The client process may also directly control the production resources that have been allocated to it. Referring to FIG. 22, the client process on the workstation controls the allocated production resources by sending commands over the AV LAN 420. The production resources can also send messages over the AV LAN 420 back to the controlling client process running on workstation 400 when an error occurs or when status is requested by the client process.

During the edit session in step 4 of FIG. 23, a user may wish to perform an operation that requires a data record that the user has not retrieved or a production resource that the user has not been allocated. For example, perhaps during an edit session a user wants to insert the digital video effect of a scene spinning onto the screen from a corner. The effect requires the use of a Digital Multi-Effects 473 (DME) production resource. In such a situation, the client process running on the workstation would make a request to the Resource Allocator over the computer network 450 for the allocation of a DME 473. If the DME 473 was "free" (not currently being used by anyone else), the Resource Allocator would allocate the DME 473 to the client process. The Routing Manager would make the necessary connections on a routing switcher to direct the audio and video signals appropriately. After the user has created the desired effect and completed his use of the DME 473, the client process running on the workstation would store the current DME 473 setting for future reference. The client process would then return the DME 473 to the Resource Allocator so that the DME 473 would be free to be used by other users at other workstations.

The user continues to edit the data and production resources until he is finished with his edit session. Having completed his edit session, in step 5 of FIG. 23 the client process returns the modified data records and resource allocation information to the Object-Oriented Database Server. Referring to FIG. 22, the data records and production resource allocation information are returned to the Object-Oriented Database Server and Resource Allocator respectively over the computer network 450.

Finally, in step 6 of FIG. 23, the Object-Oriented Database Server updates the master element database using the returned data records. The Object-Oriented Database Server also returns the production resource allocation information to the Resource Allocator. The Resource Allocator marks the returned production resources as "free" so they may now be accessed by other users.

As previously mentioned, the present invention uses an distributed object-orient database, such as "ObjectStore" by Object Design of Burlington, Mass., to organize and store the data elements created by the users. The use of an object-oriented database allows a user of the present invention to create links between any of the data records. When the user has finished his edit session, the modified data records are sent to the Object-Oriented Database Server which then updates the master element database to include all of the new links. The advantages of using an object-oriented database are best demonstrated by an example.

Suppose a producer is using the present invention to produce a dramatic television show. While in the "edit mode" editing a scene, the producer may decide that a scene needs to be rewritten or modified. The producer may then switch to "plan mode" to bring a up a word processor in order to make a few notes on how the scene should be changed or modified. He may then "attach" his notes to the scene, so that his notes will reappear when reviewing the scene later. The object-oriented database accomplishes this by creating a "link" between the video scene and the word-processor data. The producer can also use such notes to indicate when certain sound effects should be added to the scene. The information can then be given to a foley artist (sound effects specialists) who will examine the scene containing the producer's notes and replace then with the appropriate sound effects retrieved from a sound effects library Like the producer's notes, the object-oriented database creates "links" which add the sound effects into the edited scene. Alternatively, the sound effects can be edited into a soundtrack for the scene.

The Venues User Interface

The present invention incorporates a user interface unknown in the prior art which is the subject of the copending '821 and '694 parent applications. The present invention's user interface is discussed below with reference to its use in the topology of the AV LAN configuration of the subject application.

Figure 24:
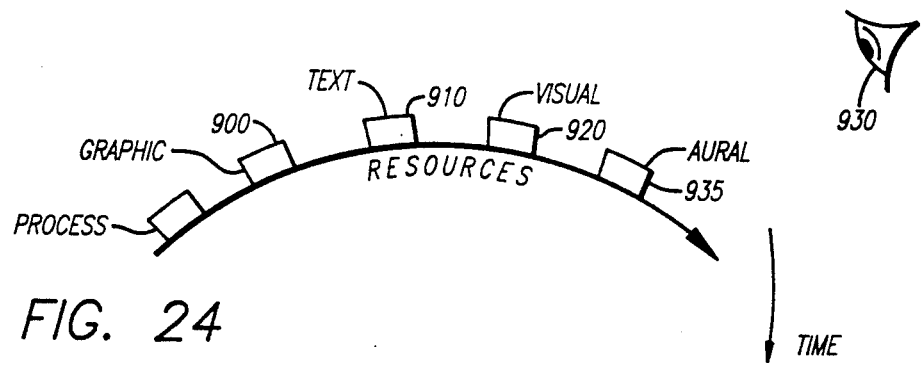
FIG. 24 is a conceptual illustration of the present invention's use of venues to represent data sets of resources available to a user.

Referring now to FIG. 24, the present invention conceptually permits a variety of production resources such as graphics 900, text 910 and visual resources 920, and aural resources 935 to be viewed by a user 930 through a "view port", relative in time, along an "event horizon". As will be described, a view port provides a perspective view of data contained in a "venue", wherein a venue may include a plurality of resources such as aural resources 935, visual resources 920, etc. The data contained in the "venue" is manipulated by the object-oriented database manager, the viewport merely acts as a window into the database. It will be noted that the various resources described herein are representative of the resources previously described with reference to FIGS. 2–21.

Figure 25:
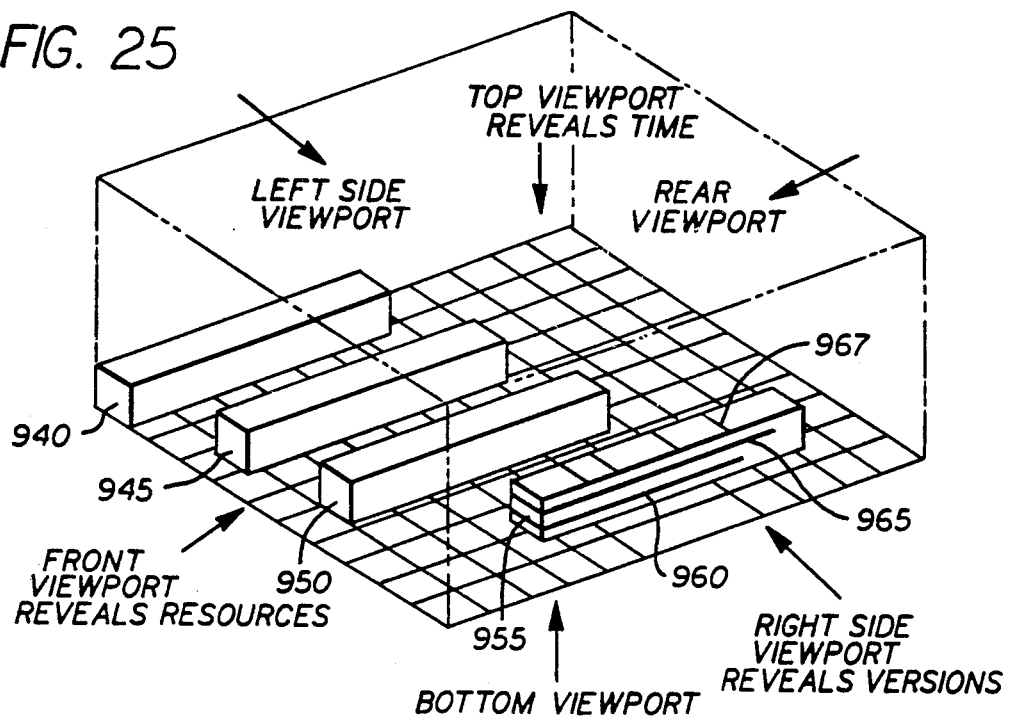
FIG. 25 conceptually illustrates the use of venues and view ports by the interface of the present invention.

Referring now to FIG. 25, the present invention's concept of venues is disclosed in relation to three-dimensional space. The venue concept of the present invention allows the user 930 to view data represented in alternative view ports of a venue. Relationships between a variety of resources are apparent based on the view which the user 930 chooses. As illustrated in FIG.

25, a venue is a conceptual three-dimensional space in which object "elements" reside. An "element" is a three-dimensional representation of an abstract data set associated with a resource coupled to the AV LAN network 420 of FIG. 19. Depending on the view port which is chosen, the elements identify themselves in various ways. For example, in FIG. 25, element 940 may comprise a graphics resource, element 945 may represent an audio resource, element 950 may represent a textual planning resource, and element 955 may represent a music or other audio resource. Viewing a venue through a top view port reveals the relative placement of the various elements in time, both the duration of time that an element represents (such as a film "take") and the relationship between the resources to a reference time, which may be a recording machine, finished film or other multi-media piece. Viewing the right side view port reveals versions of the elements, for example, audio element 955 includes two versions; namely, version 960 and version 965, along with the relative time lengths of the versions. In addition, it should be noted that the user interface of the present invention permits the use of multiple venues, wherein some or all of the venues may share the same time period, and each venue includes its own elements.

For sake of example, assume that the elements illustrated in FIG. 25 represent resources for the production of a soap opera. In this example, assume that a production crew videotaped a number of different scenes that comprise the episode. Assume further that there are several versions or "takes" of each scene. The different scenes are referred to by the designations scene 1, scene 2, etc. The different versions of each scene are referred to as take 1, take 2, etc.

Viewing an element through the front view port reveals the type of resource through the use of an icon label. For example, in the case of an audio resource, the icon label may comprise a graphic representation of a musical note. In addition, the various versions are illustrated, as in the case of element 955 in FIG. 25, by darkened lines traversing the longitudinal length of the rectangular element image. The version may be activated, and thereby run, by placing a cursor on the screen of display 600 over one of the activation buttons on the element, and providing an activation signal, such as from a "mouse" button, to run that particular version of the resource. Returning to the present example of a soap opera production, versions 960 and 965 of the audio element 955 may comprise different musical options for use during the particular time associated by the length of the elements viewed in FIG. 25. Similarly, if the resource comprises scenes, then, as is common in the industry, each of these scenes may have associated time codes (such as SMPTE) which comprises the time in and out for each scene. Accordingly, by viewing the element representing the resource in terms of time, the time length of each scene would be represented on the element by the length of the particular version lines, for example 960 and 965, or alternatively, by duration lines 967 defining the beginning and end time of each scene of the resource.

Figure 26:
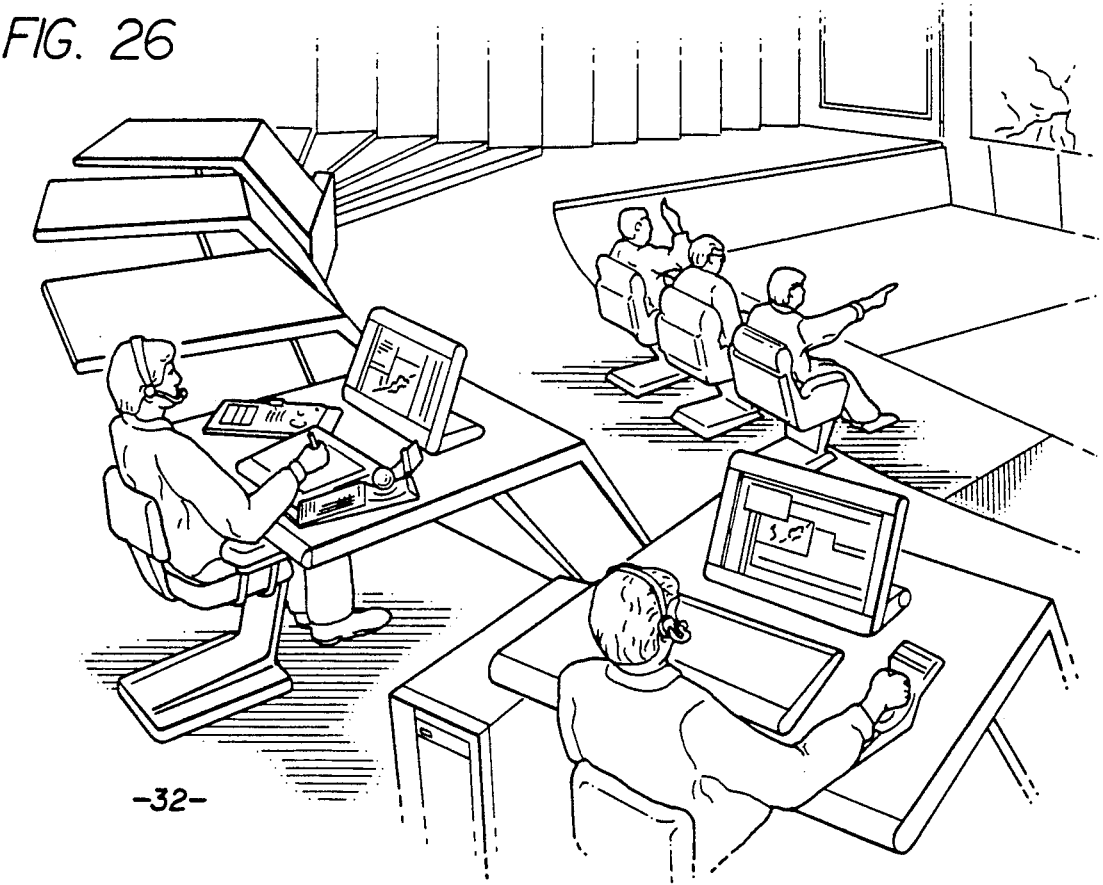
FIG. 26 illustrates operators controlling various resources through the use of the present invention's common user interface.

Referring now to FIG. 26, an artist's illustration shows two producers using workstations of the present invention. It is intended that every workstation present a single common graphical user interface which enables the user to manipulate production resources in an intuitive manner. The users interact with the graphical user interface using a standard keyboard and various cursor control devices, such as a spaceball, mouse, or a trackball.

Figure 27:
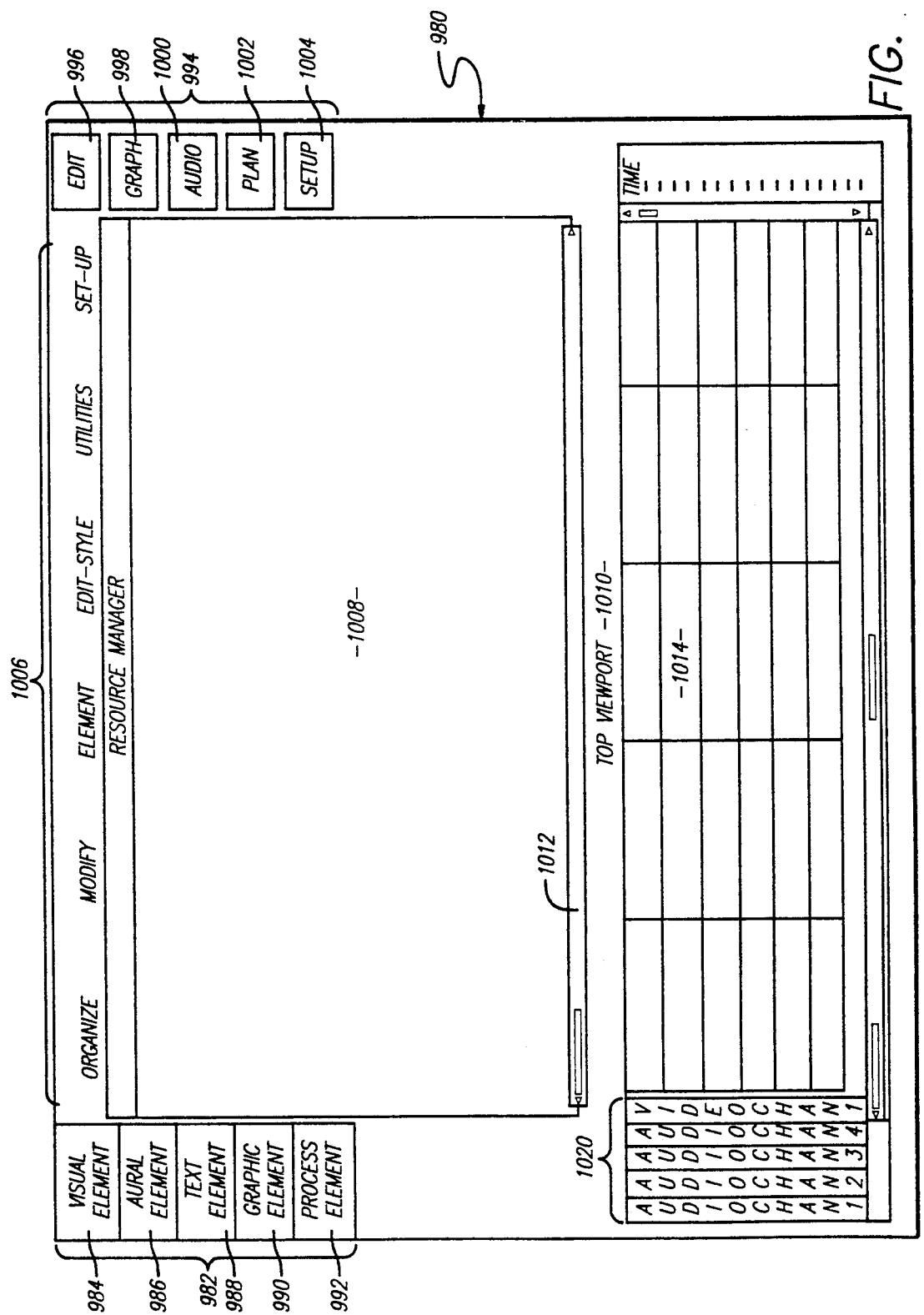
FIG. 27 is a view of a user display screen utilizing the control frame and venues concept in the present invention's graphical user interface.

Referring now to FIG. 27, the graphical user interface of the present invention will be described. As shown in FIG. 27, the present invention's user interface includes a basic control frame 980 which in practice fills substantially all of the outer border of the display screen. The control frame 980 is the primary context for interacting with the user interface of the present invention, and is, primarily, comprised of four control panels which surround an application work area. Three of the panels are visible to the user at all times, and the bottom panel (not shown) is displayed on an as needed basis. The mode specific action panel 982 comprises, in the displayed embodiment, a plurality of direct action buttons, or icons, which change with the program mode. In the illustration of FIG. 27, the mode specific action panel 982 comprises a visual element 984, an aural element 986, a text element 988, a graphic element 990, and a process element 992. Although buttons 984, 986, 988, 990, and 992 are illustrated in FIG. 27, it will be appreciated that the mode specific action panel buttons/icons change to support and reflect the current application activities of the user for a particular venue.

The control frame 980 further includes a major mode panel 994, which comprises an edit button 996, a graphics button 998, an audio button 1000, a plan button 1002, and a set up button 1004. It will be noted that although throughout this description icons, buttons, and the like are described, that the reference to buttons, icons, etc. represents any class of displayed items which result in some executable action when chosen by a user/producer. Therefore, although an edit button 996 is disclosed as part of the control frame 980, it will be appreciated to one skilled in the art that the edit button 996 may comprise an icon in the form of some edit feature or the like which achieves the same result. In the presently preferred embodiment, the buttons comprising the major mode panel 994 are always present for the user no matter which venue or other option is selected.

In general, the major mode panel 994 permits a user to access different venues than the venue currently displayed. The specific buttons/icons used in the major mode panel 994 is a function of the particular project in which the user interface is used as part of. The CPU 510 generates and displays a function bar panel 1006 which displays titles of available functions. The functions listed on the left side of the function bar panel 1006 are referred to as "global utilities", identifying globally available functions, such as "organize", "modify", etc. In the present embodiment, these functions are provided no matter which venue or resource is accessed. Other functions are displayed on the right side function bar panel 1006 depending on the context and specific application, such as "element", "edit style", "utilities", and "setup". As is discussed in the copending '694 parent application, the present invention provides an improved method for the selection of function items on the function bar panel 1006.

The application specific construction area 1008 comprises an application area of the display for a selected program mode, and is available for subwindows, user views in the display of other elements of work product such as time lines, scripts, scores, preview monitors, etc. As shown in FIG. 27, construction area 1008 is designated as a resource manager. As will be described, a top view port 1010 is also provided in construction area 1008. As previously illustrated in FIG. 25, elements representing resources may be viewed in the construction area 1008 and operated on utilizing the functions provided on control frame 980. Although the construction area 1008 displays objects in two dimensions, by appropriately selecting the view port, the elements may be viewed from all three dimensions. Elements, utilized in the present invention, directly represent the objects that make up a production, such as scripts, segments of video tape, score, scenes, director notes, sound tracks, etc., and are identified by an icon on the front face of the element as previously described. Elements can be viewed from the front, side, or from the top, or in multiple views. As previously discussed with reference to the concept of "resources", the front view o f the element displays the icon label and the type of element may be determined from the icon on its face. Viewing an element from the top view port illustrates the relative length in time the element may have. A view from a side view port illustrates any different versions and their relative lengths. The element/resource may comprise several individual elements, and may be bundled into a new compound element much like current users may group graphical elements using a graphics editor.

Referring once again to FIG. 27, the top view port 1010 is used by the present invention to position elements relative to time by placing them on a time line. As will be described in more detail below, placing an element on a bar referred to as the "event horizon" 1012 integrates the element into the overall time line for the production and results in the display of time data in the area identified as 1014. Moving an element from construction region 1008 to the event horizon 1012 results in the element being assigned a time assignment in the view port 1010. It will be noted that the view port 1010 corresponds to the top view port view of an element in the three-dimensional representation of resources described with reference to FIG. 25.

Figure 28:
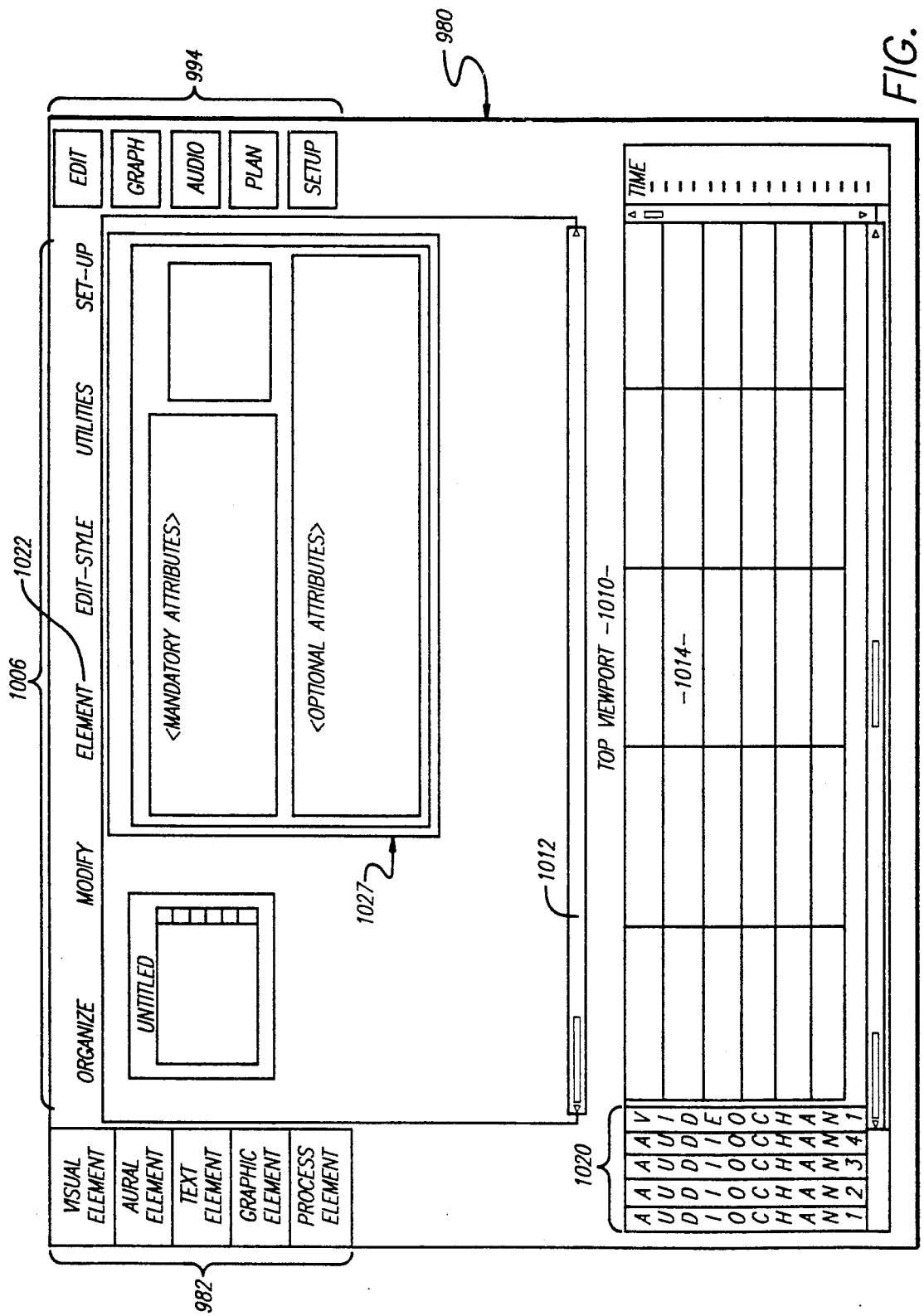
FIG. 28 is the same view as FIG. 27 except with the element attributes window open for venue selection.

Referring now to FIG. 28, assume for sake of example that a user desires to define an element using the present invention's user interface. An element attribute box 1027 is displayed by workstation 500 (see FIG. 18) once a function item selection identified as "element" 1022 is chosen by a user (See copending '694 parent application for the method of selection of a function item, such as "element"). In the presently preferred embodiment, element 1022 includes a menu (not shown) having a plurality of sub-functions for selection. The function item "element" 1022 is selected by a user through the use of an input device previously described with reference to FIG. 18.

Once element 1022 is selected, the workstation coupled to the AV LAN network 420), displays the element attribute box 1027 as shown in FIG. 28. A user then either selects from a preprinted list of elements, or defines elements within the element attribute box 1027, the nature of the resource (e.g., music synthesizer 604) required for the particular production. Each element has a of a set of required attributes and a set of optional attributes. The required attributes must be filled in order to create the element. The optional attributes can be used if necessary. Examples of elements and related attributes include, but are not limited to the following:

VISUAL ELEMENT ATTRIBUTES

LABEL:
  User supplied Element identification.
  (e.g.: Video Tape Recorder, etc.)
SOURCE DEVICE:
  Assignment of device:
  (e.g.: P1, P2, RECORD, etc.)
IDENTIFICATION:
  Alpha-Numeric material
  Identification: e.g.:
  reel number, reel label, etc.
  lab roll number, etc.
SCENE/TAKE INFORMATION:
  Content Scene and Take identification.
  Scene Take file name
CODES:
  Time Code and type.
  Origin Time Code and type.
  User bit Time Code.
  User bits. Content.
  Frame Numbers.
  Edge Numbers.
  Code Numbers.
NOTES:
  Associated Text Notes For Reel &/or Content.
PRIORITY:
  User assigned Priority levels for different versions.
PROCESSING PATH:
  Information on any previous Processing that applies to this material.
  (e.g.: DUB LEVEL, COLOR CORRECTION, ETC.)

AUDIO ELEMENT ATTRIBUTES

LABEL:
  User supplied Element identification.
SOURCE DEVICE:
  Type and Assignment of device.
  (e.g. ATR, DISC, ETC.)
  P1, P2, RECORD, ETC.
IDENTIFICATION:
  Alpha-Numeric material identification.
  (e.g. Reel number, Reel label etc.
  Sound Roll Number, Label.)
SCENE/TAKE #:
  Content Scene and Take identification.
CODES;
  Time Code and type.
  Origin Time Code and type.
  User bit Time Code contents.
  Frame Numbers.
TRACKS:
  Number and Numbers of Source Track
NOTES:
  Associated Text Notes.
  For Reel &/or Content.
PRIORITY:
  User assigned Priority levels for different versions.
PROCESSING PATH:
  Information on any previous Processing that applies to this material.
  (e.g. Dub level, Equalization, etc.)

TEXT ELEMENT ATTRIBUTES

LABEL:
  User supplied Element identification.
NAME:
  Title of Text type and Document.
  (SCRIPT,
  OPENING TITLE,
  CHARACTER GENERATOR, ETC)
REVISION:

The current Text revision level relevant previous revision information.

FILE TYPES:
The Names and Types of files as the material exists in useable form.

ASSOCIATED DATA:
Any previous data files associated with creating the current file.

PROCESSING PATH:
Information on any previous Processing that applies to this material.

GRAPHIC ELEMENT ATTRIBUTES

LABEL:
User supplied Element identification.

TITLE:
A user supplied description of the Graphic element.

REVISION:
The current Graphic revision level and relevant previous revision information.

FILE TYPES:
The Names and Types of files as the material exists in useable form now.

ASSOCIATED DATA:
Any previous data files associated with creating the current file.

PROCESSING PATH:
Information on any previous Processing that applies to this material.

PROCESSING ELEMENT ATTRIBUTES

LABEL:
User supplied Element identification.

DEVICE IDENTIFICATION:
Effects Device identification.

ASSIGNMENT PATH:
Video and/or Audio routing assignments.
(e.g. CROSSPOINTS, KEY CHANNELS, ETC.)

UP LOAD/DOWN LOAD:
File input/output for created effects save and recall.

CODES:
Time Line Code and type.
Effects durations.
Effects Source codes.
Effects Edge Numbers for optical printer outputs.

PROCESSING:
Effects types. (e.g. CUTS, FADES, DISSOLVES, WIPES, KEYS, DME, ETC.)

Once the element attributes have been defined, computer 500 utilizes appropriate network connections over AV LAN network 420 to the various resources, such as the VTR 602, music synthesizer 604, audio tape recorder 606, production switcher 608 (see FIG. 18) to access the resource via the user interface. Accordingly, a virtual connection via computer 500 has been created between the user interface comprising the control frame 980 as displayed on the display 600 of a workstation, and the particular resource coupled through the AV LAN network interface 420. Continuing to refer to FIG. 28, within the top view port 1010, time elements corresponding to the particular resource have additional information that is revealed in the time line associated with the top view port 1010. Tracking buses 1020 provide information regarding the recording of audio channels 1 through 4, and a video channel 1. In practice, a source tape machine (not shown) coupled to, for example, the audio network of FIG. 7 supplies audio to an audio tape record machine wherein the channels are coupled to one another. It has been found that it is quite useful to display audio channels with the time view port 1010, in order to correlate the audio channel and time interval versus resource.

Figure 29:
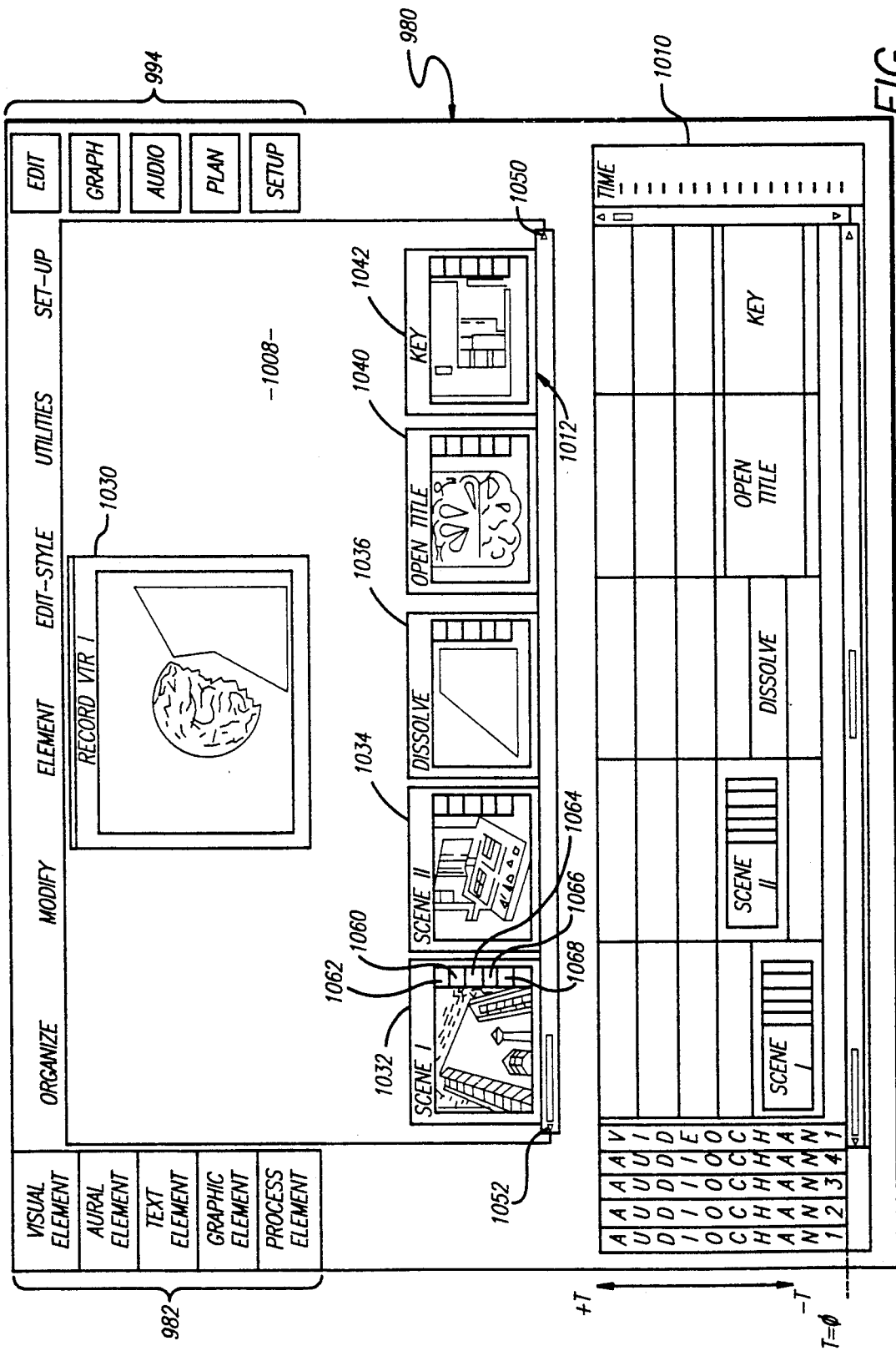
FIG. 29 is the same view as FIG. 28 further illustrating the present invention's user interface in the display of a plurality of elements and venues selected for the production of a multi-media work.

Once the required element attributes have been defined, an element representing a resource is created based upon those attributes, and displayed within construction area 1008 of the control frame 980. Referring now to FIG. 29, the present invention's user interface is illustrated wherein a plurality of elements identified as record VTR 1030, Scene I 1032, scene II 1034, Dissolve 1036, Open Title 1040, and Key 1042 are shown. As illustrated in FIG. 29, an element such as Record VTR 1030 includes an icon image (for example, the planet Earth in FIG. 29) which describes some aspect of the element for identification purposes. Viewing elements disposed in construction area 1008 normally corresponds to viewing a venue and associated resources through a front view port as shown previously with respect to FIG. 25. An element, for example, Record VTR 1030 may be moved within the construction region 1008 at will by a user 930 through the use of an appropriate command sequence, or by simply dragging the element around the construction area using a cursor control device. However, using the teachings of the present invention, once an element such as Scene I 1032 is brought, dragged, or otherwise manipulated downward to the event horizon 1012, the element is automatically given time significance which is represented along the time lines of the top view port 1010.

As illustrated in FIG. 29, the event horizon 1012 comprises a horizontal bar with arrows 1050 and 1052 at each of its opposite ends. By placing a cursor (not shown) over arrows 1050 or 1052, and presenting computer 500 with an activation signal, resource elements such as scene I 1032, scene II 1034, Dissolve 1036, etc. may be moved left or right, respectively, and other elements may be viewed which are currently not visible on the event horizon in the control frame 980. The use of arrows 1050 and 1052 permits a user to scan through elements disposed on the event horizon 1012 and view the elements not only in relative position, but in relative time. This view corresponds to that of a user 930 in FIG. 24 scanning the resources in that figure, such as special effects 900, editing 910, video 920, etc. In addition, it will be appreciated that the relative position of the element may be changed by simply "dragging" an element such as scene I 1032 off of the event horizon 1012, moving other elements into that time slot along the event horizon, and replacing scene I 1032 at some other location along the event horizon. A redistribution of the element's relative position along the event horizon would correspond in FIG. 25 to, for example, swapping element 120 for element 950 and vice versa.

Once an element is placed upon the event horizon 1012, position data relative in time to other elements is illustrated along the time lines of the top view port 1010 as shown. Conceptually, the reader is directed to FIG. 25 which illustrates in three dimensions the placement of elements relative to one another in time. However, due to the limitations of display 600, the time view port 1010 is utilized to display time along the ±Y direction, with time $T_o$ being at the lower portion of the display as illustrated in FIG. 29. In addition, as shown in FIG. 29, the number of versions of, for example, scene I 1032, is also displayed as versions 1060, 1062, 1064, 1066, 1068. It will be appreciated by the reader that the display of an element such as scene I 1032 corresponds to the prior description of a resource having multiple versions which may be activated by selecting (for example, by placing a cursor over version 1068 and providing an activation signal) a version such that the version is "run" within the window of scene I 1032. Accordingly, user 930 may view the entire version of scene I which has been selected, within the icon window comprising the scene. In general, in the present and preferred embodiment, and throughout this Specification, placing a cursor over an icon or other executable function and "double clicking" using a cursor control device such that two consecutive signals are provided to the computer 500 executes the function which has been selected, and, more particularly, reveals any attributes and/or contents of the icon. Double clicking on a time function such as time block 400 for scene I (FIG. 29) may be configured such that time code (i.e. SMPTE) is displayed. More particularly, in the present example, SMPTE time code for the beginning and end of each version within scene I 1032 may be displayed within the time line view port 1010.

Figure 30:
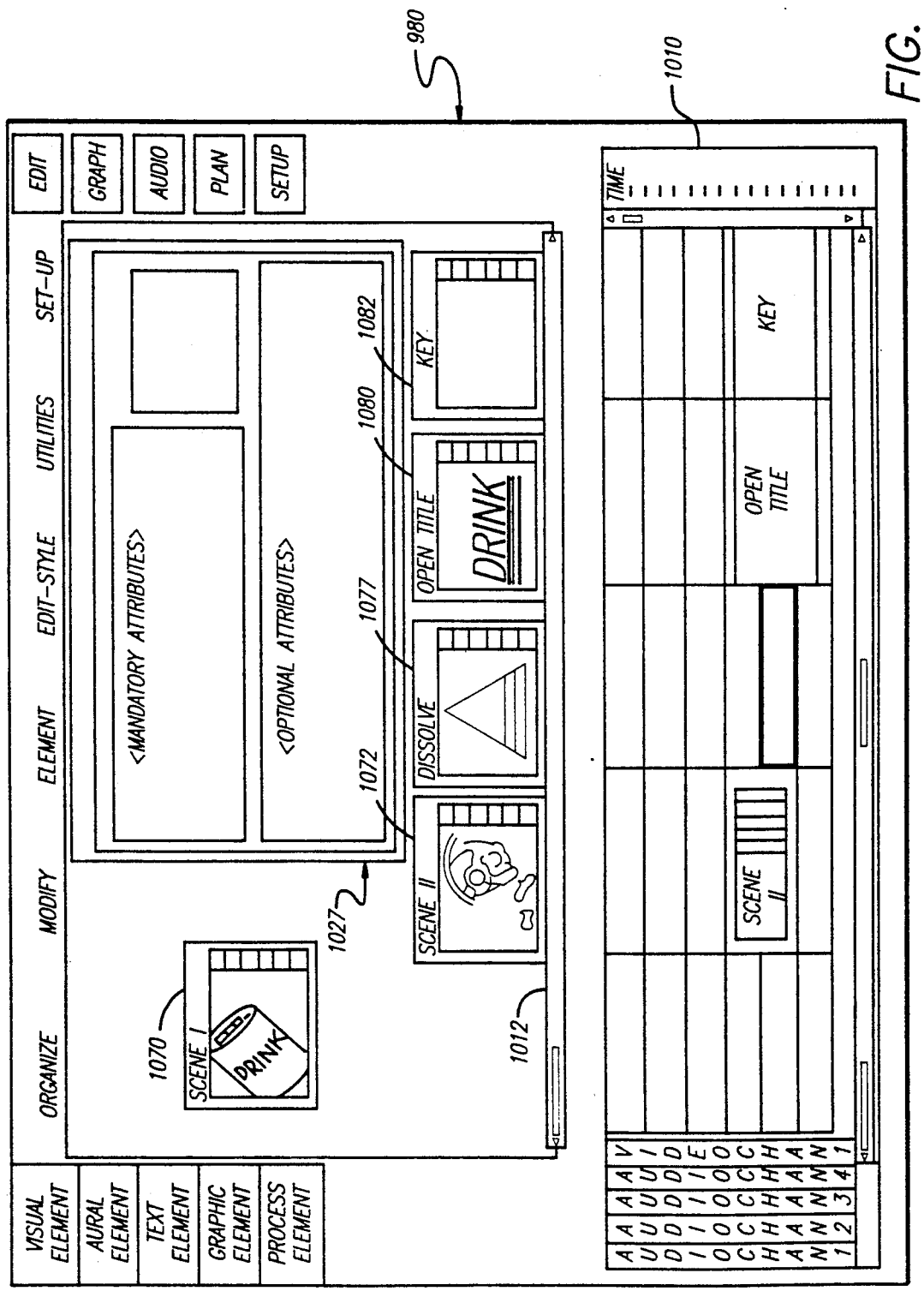
FIG. 30 is the same view as FIG. 29 further illustrating the element attribute block opened and venue and resource selection.

Referring now to FIG. 30, control frame 980 is illustrated in which a new scene I 1070 has been "dragged" upward off of the event horizon 1012 into the construction area 1008. As illustrated in FIG. 30, once an element, in the present example scene I 1070, is moved off of the event horizon 1012, timing information viewed through top view port 1010 corresponding to scene I 1070 is no longer displayed. Elements such as scene II 1072, dissolve 1077, open title 1080 or key 1082 may be repositioned along the event horizon 1012 and/or modified in terms of time sequence as viewed through top view port 1010, relative to one another. Alternatively, and as shown in FIG. 30, element attribute box 1027 may be selected and the attributes of scene I 1070 may be modified, or an entirely new element may be defined, to replace scene I 1070 along the event horizon 1012.

It will be appreciated that a user utilizing the interface comprising the present invention defines elements in the construction area 1008 by specifying attributes of the element in the element box 1027. In addition, multiple elements may be created within the construction area 1008. The created elements may then be selectively dragged to the event horizon 1012 in an arrangement and order selected by the user 930. It will further be appreciated from the above discussion by one skilled in the art that the present invention's user interface permits the utilization of resources within the systems illustrated in FIGS. 2-21, permits selective modification of the resources, and through the use of the interface of the present invention provides a consistent interface for the production of a multi-media work. The user interface of the present invention, through the use of a common control frame 980 as displayed on display 600, allows artists, musicians, and other media professionals to create, modify and rearrange resources comprising a production with flexibility heretofore unknown in the art. The present invention's concept of venues, and the ability to operate on resources in three dimensions, provides a user with flexibility not present in any prior user interface for computer display systems, as well as multi-media production systems known in the past.

The Virtual User Interface

Referring back to FIG. 29, in the case of elements which represent standard devices such as record VTR 1030, the present invention can display a window which presents the user with an emulation of the device's physical user interface. For example, an emulation of the record VTR 1030 user interface can be displayed in the application area with rewind, play, stop, fast-forward, and all the other buttons present on the actual VTR. These On-screen buttons can be manipulated with a cursor control device such as a track ball or mouse thereby operating the device. In this manner, the present invention can capitalize on the user's previous experience by presenting the user with an interface that is the same or similar to one the user has used before. The present invention can accomplishes this goal with the combination of on-screen "virtual interface" output displays and "assignable input devices".

A "virtual interface" is an on-screen display that is design to emulate the display of a physical resource such as a VTR, production switcher, or DME. In this manner a output display that the user is familiar with is presented to the user.

An "assignable input device" is a physical input device coupled to an edit workstation, such as a joystick or transition bar, that can be assigned to transmit input information to a software application running on the edit workstation. (See FIG. 18). For example, a rotary dial may be coupled to an edit workstation as an input device. The software on the workstation can "assign" input information from the dial to any function it desires. If a audio control board is being emulated, the dial can be assigned to a volume function. If a video tape recorder is being emulated the dial can be assigned as a "jog/shuttle" dial to move the video tape.

By providing a large variety of assignable input devices such as keyboards, rotary dials, transition bars, pushbuttons, optical tracks, and trackballs, that can be connected to an edit workstation, the user can build a user interface that suits their needs. For example, a beginner may be satisfied with a mouse which enables the user to manipulate on screen representations of the physical production resource. On the other hand, an experienced video editor may desire to create a physical copy of the control panel of a production switcher which he is familiar with. The input devices provided are constructed modularly such that they connected together easily.

Future User Interfaces

The present invention has been described and illustrated with reference to the Figures as applied to a display 600, and using assignable input devices, such as digital pad 545, trackball 560, etc. However, the teachings of the present invention may be applied to numerous other display devices and input mechanisms. For example, the present invention may be practiced using what is known as "virtual reality" input devices, such as but not limited to, a data input glove, body glove input device, etc. In addition, the present invention may be utilized with eye goggle displays which are worn by a user and coupled to the computer display system via fiber optics, wires and the like. When the present invention is utilized in conjunction with a virtual reality system, the user interface of the present invention would be viewed by a user through input goggles as being suspended in space. Interaction with the interface by the user may be done using an input glove or other virtual reality device worn by the user. Accordingly, it will be appreciated that the user interface of the present invention is not limited to conventional input or display devices. The reader is referred to the following references for a further description of existing and proposed virtual reality systems. Rheingold, *Virtual Reality*, Summit Books (1991), pages 70, 148–49; *Computerized Reality Comes of Age*, NASA Tech Briefs, page 10, August 1990 (Vol. 14, number 8); Iwata, *Artificial Reality with Force-Feedback: Development of Desktop Virtual Space with Compact Master Manipulator*, ACM SIGGRAPH, August 1990 (Vol. 24, number 4); Nash, *Our Man in Cyberspace Checks out Virtual Reality*, Computerworld, Oct. 15, 1990; Daviss, *Grand Illusions*, Discover, June 1990.

While the present invention has been described in conjunction with a few specific embodiments identified in FIGS. 2 through 30, it will be apparent to those skilled in the art that many alternatives, modifications and variations in light of the foregoing description are possible. Accordingly, the invention is intended to embrace all such alternatives, modifications and variations as may fall within the spirit and scope of the invention as disclosed.

I claim:

1. An integrated multi-media production and authoring system, said system comprising:

a digital communications network for carrying a plurality of addressed messages such that communication on the digital communications network takes place in real-time;

a plurality of workstations comprising digital computers coupled to said digital communications network, said workstations transmitting and receiving said plurality of addressed messages over said digital communications network; and a plurality of production resources including audio and video production and editing devices, said production resources coupled to said digital communications network, said production resources transmitting and receiving said plurality of addressed messages on said digital communications network such that a user working with any of said plurality of workstations may access any of said plurality of production resources coupled to said digital communications network to create and edit a multi-media work;

said plurality of workstations including a display system having a display and user input means, said display system comprising:

a user interface for display on said display, said user interface displaying representations of said production resources coupled to said digital communications network with which a user interacts using said user input means;

said representations of said production resources comprising at least three dimensions and being arranged in a venue of at least three dimensions, each of said dimensions corresponding to an attribute of said production resources which may be viewed using said user interface from a plurality of view ports, such that viewing said representations of said production resources from different view ports results in the display of different attributes of said production resources;

said representations of said production resources being arranged in said venue such that each of said production resources is disposed relative to one another in time and space within said venue; manipulation means coupled to said user input means for selectively positioning said representations of said production resources within said venue.

2. The system as defined by claim 1 wherein said venue may be viewed from six view ports, namely, a top, left, right, rear, bottom and front view port.

3. The system as defined by claim 2 wherein viewing said venue from a top view port reveals the relative positions of each of said three dimensional representations of said production resources relative in time to one another.

4. The system as defined by claim 3 wherein viewing said venue from a front view port reveals an icon identifying the type of production resource each of said representations represent.

5. The system as defined by claim 4 wherein viewing said venue from a side view port reveals versions of said production resource and the lengths of said versions relative to one another.

6. The system as defined by claim 5 wherein viewing said venue from a front view port further reveals version activation buttons, one of said buttons for each of said versions, such that said user, using said user input means may selectively activate said versions.

7. The system as defined by claim 6 wherein if said user activates one of said versions, said version is executed within said representation of said production resource, and may viewed through said front view port of said venue on said display.

8. The system as defined by claim 7 wherein said user interface includes interface generation means for generating and displaying a control frame using said display means to display selected view ports of a venue, said control frame including a plurality of command options which may be selected by said user using said user input means.

9. The system as defined by claim 8 wherein said control frame further includes a first area for defining said attributes of said resources and displaying said representations of said resources once said attributes are defined.

10. The system as defined by claim 9 wherein said first area displays said representations of said production resources in a venue initially from a first view port.

11. The system as defined by claim 10 wherein said user may selectively change view ports from said first view port by selecting one of said command options.

12. The system as defined by claim 11 wherein said control frame further includes a second area for displaying said top view port of said venue, such that timing data representing relative time associated with said production resources is displayed in said second area.

13. The system as defined by claim 12 wherein said control frame further includes a event horizon bar, such that the placement of a representation of a production resource on said bar results in said timing data being displayed in said second area of said control frame.

14. The system as defined by claim 13 wherein selecting an Element command option results in the display of an element attribute box for defining said production resource attributes.

15. The system as defined by claim 14 wherein said representations of said production resources may be selectively placed on said event horizon bar, thereby altering the relative placement of said representations in said venue in time and space.

16. The system as defined by claim 15 wherein said command options of said control frame further includes a plurality of mode specific action options on the periphery of said control frame.

17. The system as defined by claim 16 wherein said command options of said control frame further includes a plurality of major mode options on the periphery of said control frame.

18. The system as defined by claim 17 wherein said first view port initially displayed comprises the front view port.

19. The system as set forth in claim 1 wherein each of said plurality of production resources are coupled to said digital communications network through a device translator, said device translator comprises:
   a network interface coupled to said digital communications network such that said device translator transmits and receives said plurality of addressed messages over said digital communications network;
   a central processing unit coupled to said network interface, said central processing unit programmed such that the plurality of addressed messages received over said digital communications network are translated into a plurality of device-specific commands; and
   a device-specific interface coupled to said central processing unit and coupled to said production resource associated with said device translator, wherein said device translator communicates said plurality of device-specific commands to said production resource;
wherein said device translator translates said received plurality of addressed messages into said plurality of device specific commands.

20. The system as set forth in claim 19 wherein said device translator includes a programmable translation data set stored in a memory means coupled to said central processing unit such that said device translator can be programmed to translate said plurality of addressed messages into a plurality of device-specific commands for a plurality of different production resources.

21. The system as set forth in claim 20 wherein said programmable translation data set is downloaded into said memory means in said device translator through said digital communications network.

22. The system as set forth in claim 1 further comprising a library management system coupled to said digital communications network.

23. The system as set forth in claim 22 wherein said library management system comprises:
   a library of digital media storage units;
   means for accessing said digital media storage units, said accessing means coupled to said digital communications network;
   means for loading said digital media storage units into said accessing means, said loading means coupled to said digital communications network.

24. The system as set forth in claim 23 wherein said digital media storage units in said library management system comprise magnetic tapes.

25. The system as set forth in claim 24 wherein said accessing means in said library management system comprise digital video tape recorders.

26. The system as set forth in claim 23 wherein said accessing means in said library management system comprise digital data tape recorders.

27. The system as set forth in claim 23 further comprising a matrix routing switcher coupled to said digital communications network.

28. The system as set forth in claim 27 wherein said matrix routing switcher is coupled to said plurality of production resources, said matrix routing switcher establishing a plurality of signals paths between said production resources.

29. An integrated multi-media production studio comprising:
   a plurality of local area networks coupled to each other wherein each said local area network carries a plurality of addressed messages;
   a plurality of production resources devices coupled to said local area networks, each of said plurality of production resources able to transmit and receive said plurality of addressed messages; and
   a plurality of workstations coupled to said local area networks, each of said plurality of workstations able to transmit and receive said plurality of addressed messages wherein a user working on any said plurality of workstations may transmit and receive messages to any of said plurality of production resources coupled to said plurality of local area networks;
   said plurality of workstations including a display system having a display and user input means, said display system comprising:
      a user interface for display on said display, said user interface displaying representations of said production resources coupled to said digital communications network with which a user interacts using said user input means;
      said representations of said production resources comprising at least three dimensions and being arranged in a venue of at least three dimensions, each of said dimensions corresponding to an attribute of said production resources which may be viewed using said user interface from a plurality of view ports, such that viewing said representations of said production resources from different view ports results in the display of different attributes of said production resources;
      said representations of said production resources being arranged in said venue such that each of said production resources is disposed relative to one another in time and space within said venue;
      manipulation means coupled to said user input means for selectively positioning said representations of said production resources within said venue.

30. The system as set forth in claim 29 wherein each of said plurality of production resources are coupled to said local area network local area networks through a device translator.

31. The system as set forth in claim 30 wherein said device translator comprises:
   a network interface coupled to said local area networks such that said device translator transmits and receives said plurality of addressed messages over said local area networks;
   a central processing unit coupled to said network interface, said central processing unit programmed such that the plurality of addressed messages received over said local area networks are translated into a plurality of device-specific commands; and
   a device-specific interface coupled to said central processing unit and coupled to said production resource associated with said device translator, wherein said device translator communicates said plurality of device-specific commands to said production resource;

wherein said device translator translates said received plurality of addressed messages into said plurality of device specific commands.

32. The system as set forth in claim 31 wherein said device translator includes a programmable translation data set stored in a memory means coupled to said central processing unit such that said device translator can be programmed to translate said plurality of addressed messages into a plurality of device-specific commands for a plurality of different production resources.

33. The system as set forth in claim 32 wherein said programmable translation data set is downloaded into said memory means in said device translator through said digital communications network.

34. A method for accessing and editing a set of multi-media elements in a distributed computing environment, said method comprising the steps of:

providing a digital communications network coupled to a plurality of multi-media production resources having defined attributes and a plurality of edit workstations each of said workstations including a central processing unit (CPU) coupled to a display and user input means, one of said edit workstations executing a database server process and an allocation and routing process;

commencing an edit session on an edit workstation by requesting a set of multi-media elements and production resources using a client process running on said edit workstation;

extracting said set of multi-media elements from a multi-media element database using said database server process;

providing said set of multi-media elements from said database server process to said client process;

allocating production resources from a production resource allocation and routing database using said allocation and routing process;

providing said allocated production resources from said allocation and routing process to said client process;

editing said multi-media elements using said client process on said edit workstation including the steps of:

providing a user interface on said screen of said display for displaying representations of said production resources coupled to said display system with which a user interacts through said user input means;

generating and displaying a control frame on said display using interface generation means coupled to said CPU, said control frame including a plurality of command options which may be selected by said user using said input means, and further including an event horizon bar, such that the placement of a representation of a resource on said bar using said user input means results in predetermined data being displayed in said control frame, and said representations of said resources being disposed relative to one another in time;

said representations of said production resources comprising at least three dimensions and being arranged in a venue comprising at least three dimensions which may be viewed using said user interface from a plurality of view ports, such that viewing said representations of said resources from different view ports results in the display on said screen of different attributes of said resources;

completing said edit session by returning multi-media elements to said database server and returning said allocated production resources to said allocation and routing process;

updating said multi-media element database and said production resource allocation and routing database.

* * * * *